United States Patent
Hewak et al.

(10) Patent No.: US 7,016,593 B2
(45) Date of Patent: Mar. 21, 2006

(54) OPTICAL WAVEGUIDE[[S]] AND OPTICAL FIBER PERFORM INCLUDING GALLIUM, LANTHANUM, SULFUR, OXYGEN, AND FLUORINE

(75) Inventors: Daniel William Hewak, Southampton (GB); Mohammed Khawar Arshad Mairaj, Southampton (GB)

(73) Assignee: The University of Southampton, Southampton (GB)

( * ) Notice: Subject to any disclaimer, the term of this patent is extended or adjusted under 35 U.S.C. 154(b) by 0 days.

(21) Appl. No.: 10/930,865

(22) Filed: Sep. 1, 2004

(65) Prior Publication Data

US 2005/0025448 A1 Feb. 3, 2005

Related U.S. Application Data

(62) Division of application No. 10/210,074, filed on Aug. 2, 2002, now Pat. No. 6,803,335.

(60) Provisional application No. 60/310,243, filed on Aug. 7, 2001.

(30) Foreign Application Priority Data

Aug. 3, 2001 (EP) ................... 01306687

(51) Int. Cl.
*G02B 6/00* (2006.01)
*G02B 6/02* (2006.01)

(52) U.S. Cl. ................ 385/141; 385/142; 385/143; 385/144; 385/123

(58) Field of Classification Search ................ None
See application file for complete search history.

(56) References Cited

U.S. PATENT DOCUMENTS

| | | | | |
|---|---|---|---|---|
| 5,392,376 | A | * | 2/1995 | Aitken et al. ............ 385/144 |
| 5,822,479 | A | | 10/1998 | Napier et al. |
| 5,936,762 | A | * | 8/1999 | Samson et al. .......... 359/337.3 |
| 6,226,308 | B1 | * | 5/2001 | Samson et al. ............ 372/40 |
| 6,800,574 | B1 | * | 10/2004 | Anderson .................. 501/33 |
| 6,803,335 | B1 | * | 10/2004 | Hewak et al. .............. 501/43 |
| 2003/0026515 | A1 | * | 2/2003 | Barenburg et al. .......... 385/14 |
| 2003/0049003 | A1 | * | 3/2003 | Ahmad et al. ............ 385/123 |
| 2003/0118315 | A1 | * | 6/2003 | Hewak et al. ............. 385/142 |
| 2003/0161599 | A1 | | 8/2003 | Broderick et al. |
| 2004/0037539 | A1 | * | 2/2004 | Park ........................ 385/142 |
| 2005/0163452 | A1 | * | 7/2005 | Park ........................ 385/143 |

FOREIGN PATENT DOCUMENTS

| | | |
|---|---|---|
| EP | 0 843 186 | 5/1998 |
| WO | WO 97/08790 | 3/1997 |
| WO | WO 98/08120 | 2/1998 |

OTHER PUBLICATIONS

Flahaut et al.; "Rare Earth Sulphide and Oxysulphide Glasses"; Glass Technology, vol. 24, No. 3, pp. 149-156, (1983).

(Continued)

*Primary Examiner*—Frank G. Font
*Assistant Examiner*—Mary El-Shammaa
(74) *Attorney, Agent, or Firm*—Finnegan, Henderson, Farabow, Garrett & Dunner, L.L.P.

(57) ABSTRACT

An optical waveguide includes a clad of clad glass and a core of core glass. The clad glass includes gallium, lanthanum, and sulfur. The clad glass may include gallium sulfide and lanthanum oxide. The clad glass may also include lanthanum fluoride. The core glass includes gallium, lanthanum, sulfur, oxygen, and fluorine. The core glass may include gallium sulfide, lanthanum oxide, and lanthanum fluoride. An optical fiber perform is also disclosed.

13 Claims, 18 Drawing Sheets

OTHER PUBLICATIONS

Morgan et al.; "Lanthanum-Fluoride Addition to Gallium-Lanthanum-Sulphide Glasses"; Journal of Non-Crystalline Solids, vol. 203, pp. 135-142, (1996).

Itoh et al.; "Low-Loss Fluorozirco-Aluminate Glass Fiber"; Journal of Non-Crystalline solids, vol. 167, pp. 112-116, (1994).

West et al.; "Gallium Lanthanum Sulphide Fibers for Infrared Transmission"; Fiber and Intergrated Optics, vol. 19, pp. 229-250, (2000).

Birks et al.; "Four-Port Fiber Frequency Shifter With a Null Taper Coupler"; Optics Letters, vol. 19, No. 23, pp. 1964-1966, (1994).

Hyun et al.; "All-Fiber Acoustooptic Filter With Low-Polarization Sensitivity and No Frequency Shift"; IEEE Photonics Technology Letters, vol. 9, No. 4, pp. 461-463, (1997).

Wang et al.; "Halide-Modified Ga-La Sulfide Glasses With Improved Fiberdrawings and Optical Properties for $Pr^{3+}$-Doped Fiber Amplifiers at 1.3 $\mu$m"; Appl. Phys. Lett., vol. 71, No. 13, pp. 1753-1755, (1997).

Wang et al; "Modifying Binary $Ga_2S_3$-$La_2S_3$ Glass by the Addition of a Third Component"; $10^{th}$ International Symposium on Non-oxide Glasses, pp. 8-13, (1996).

Strizhkov et al.; "Preparation of Anhydrous Yttrium Fluorides"; Neorganicheskie Materialy, vol. 8, pp. 1428-1433, (1972).

* cited by examiner

LD1021-5     GLSOF (70:5:25) mol%

LD1021-6     GLSOF (70:7.5:22.5) mol%

LD1026          GLSOF (70:10:20) mol%

LD1021-7          GLSOF (70:12.5:17.5) mol%

LD1009-4    GLSOF (70:15:15) mol%

LD1007-6    GLSOF (70:20:10) mol%

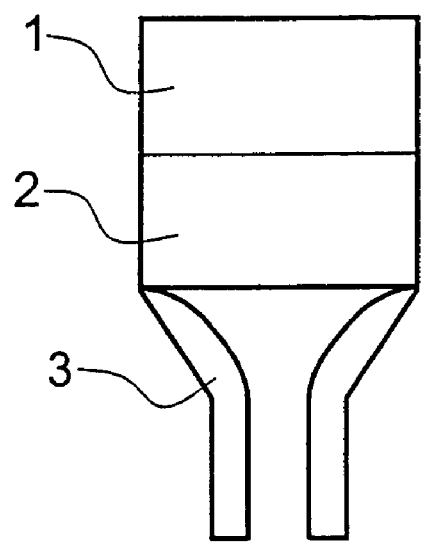
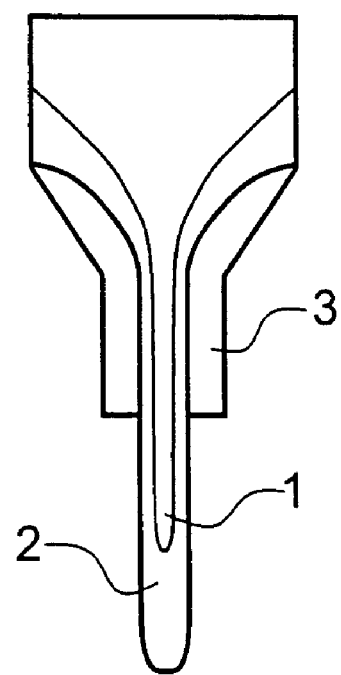
Fig. 6B
Fig. 6C
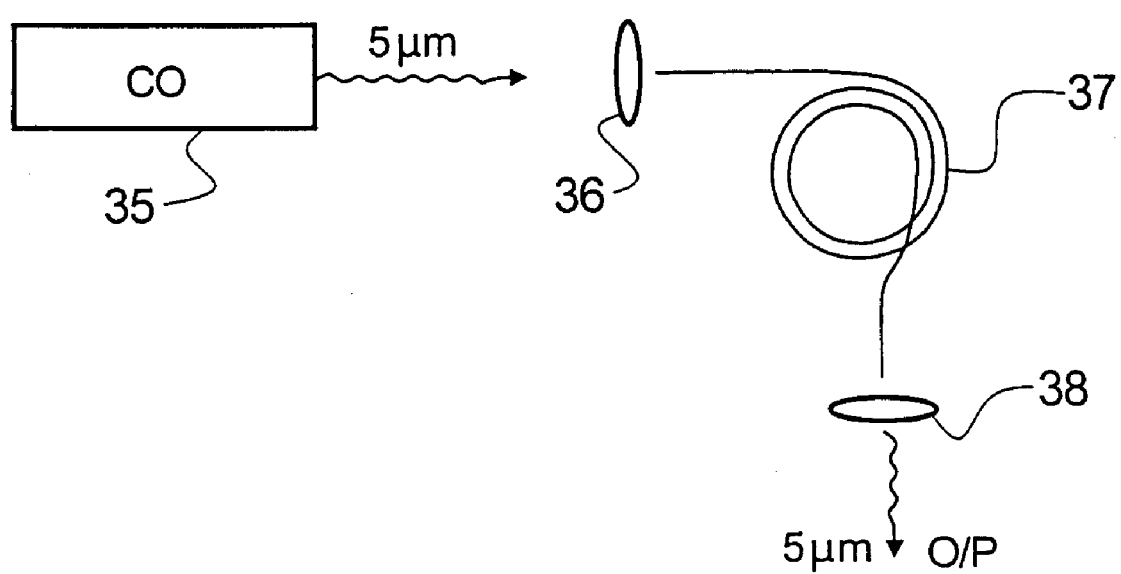
Fig. 8

OPTICAL WAVEGUIDE[[S]] AND OPTICAL FIBER PERFORM INCLUDING GALLIUM, LANTHANUM, SULFUR, OXYGEN, AND FLUORINE

CROSS-REFERENCE TO RELATED APPLICATIONS

This application is a divisional application of U.S. patent application Ser. No. 10/210,074, filed Aug. 2, 2002, the content of which is relied upon and incorporated herein by reference; additionally, Applicants claim the right of priority under 35 U.S.C. § 119(a)–(d) based on patent application No. 01306687.3, filed Aug. 3, 2001, in the European Patent Office; further, Applicants claim the benefit under 35 U.S.C. § 119(e) based on prior-filed, copending provisional application No. 60/310,243, filed Aug. 7, 2001, in the U.S. Patent and Trademark Office.

BACKGROUND OF THE INVENTION

The invention relates to optical glass, in particular optical glass for fabricating optical fiber. More especially, the invention relates to Ga:La:S (GLS) glass and related compounds, and to optical fiber and optical devices using such glass.

The production of Ga:La:S (GLS) based fiber without devitrification is an issue that needs addressing. Reaching fiber-drawing viscosities between $10^4$–$10^6$ poise at temperatures much less than the onset of crystallization has proven difficult. The high melting temperature (1150° C.) required for the processing of Ga:La:S glass restricts the choices of additives that can be used to act as modifiers.

Advantages of Ga:La:S based glass over other competing glass for active and infrared applications are evident through its low-phonon energy, high rare-earth solubility, high glass transition temperature and non-toxicity. However, the tendency to devitrify during fiber drawing hinders the production of small core fiber. Improving thermal properties of Ga:La:S glasses through addition of selected compounds may hold the key to achieving practical fiber.

The addition of a modifier into the Ga:La:S glass matrix provides a way to achieve the improvements required. Modifiers can introduce higher thermal stability for potential fiber drawing and the ability to transmit further into the visible spectrum. One important goal is to provide a GLS glass capable of shifting the $Pr^{3+}$ emission peak at 1.3 $\mu$m closer to the all important 2nd telecommunications window.

For active applications such as fiber amplifiers, these compositional modifications are also beneficial through the reduction of oxide in the glass. Most importantly, it is important that modified Ga:La:S glasses still retain the key characteristics of Ga:La:S.

Some Ga:La:S modifiers that have been studied are as follows [4]:

| GLS modifiers | |
| --- | --- |
| Modifier | Change to Glass |
| Lanthanum oxide | Improved thermal stability, visible transmission |
| Cerium sulfide | Improved thermal stability |
| Aluminum sulfide | Improved thermal stability, visible transmission |
| Indium sulfide | Improved thermal stability |
| Lanthanum fluoride | Improved thermal stability, visible transmission, purification |
| Bismuth sulfide | Raises refractive index |
| Germanium | No obvious improvement |
| Sodium | Improved low loss fiber |

Further work by J. Wang et. al., [11] has studied the effect of adding Cesium Chloride (CsCl) as a modifier to GLS. GLS:CsCl glasses were characterized to show low-phonon energy and high rare-earth solubility while providing improved thermal & optical properties over GLS. Furthermore, GLS:CsCl glasses exhibited blue shifting into the visible, advantageous for active applications. GLS was successfully doped with up to 30 mol % of CsCl. However, 25 mol % was found to be the optimum as the fiber-drawing capabilities were improved considerably. Initial fiber attenuation measurements revealed losses of 10 dB/m at 1.3 $\mu$m. In fluorescence measurements for the $Pr^{3+}$ ion, both GLS and GLS:CsCl had peak emission at 1.34 $\mu$m. A serious drawback with GLS:CsCl glasses during bulk production (of about 170 g), is the shattering of glass ingots in the carbon boats due to its high expansion coefficient.

Other work by J Wang et al [12] studied the effects of adding various lanthanum compounds to GLS, namely $LaF_3$, $LaCl_3$, $LaBr_3$ and $LaI_3$. The effect of adding the halides was characterized in terms of the stability parameter $T_x$-$T_g$ obtained from differential thermal analysis (DTA) studies. The authors reported that the addition of increasing amounts of $LaF_3$ causes a constant deteriorating effect in the thermal stability of the glasses, whereas the addition of $LaCl_3$ or $LaBr_3$ causes an improving effect on the thermal stability up to approximately 8 mol %, with a peak at around 2 to 3 mol %. The addition of $LaI_3$ into the GLS initially causes a deteriorating effect on thermal stability up to 8 mol %, then it starts to show an improving effect on thermal stability with a peak around 20 mol %. In summary, this work showed that addition of large amounts of $LaI_3$ or small amounts of $LaCl_3$ or $LaBr_3$ may be beneficial to GLS, whereas addition of $LaF_3$ to GLS is harmful.

There is still a need for discovering new GLS compositions that provide some improved properties, while retaining the key characteristics of basic Ga:La:S glass.

SUMMARY OF THE INVENTION

The invention relates to a new and improved hybrid of Ga:La:S (GLS) glass, namely a glass of the Ga:La:S group, comprising Ga, La, S, O and F (GLSOF), preferably at least 2% F.

The GLSOF glass may be fabricated by mixing the ingredients gallium sulfide and lanthanum oxide, suitable for making Ga:La:S:O (GLSO) glass with at least 2 mol % lanthanum fluoride. Fabrication of the GLSOF glass may thus be viewed as adding lanthanum fluoride to GLSO glass. GLSOF glass according to the invention has been shown to retain the fundamentally important properties of the Ga:La:S system, while introducing improved thermal stability and spectroscopic properties. The improved thermal stability of GLSOF is somewhat surprising in view of earlier work by Wang et al [12] which showed that the addition of lanthanum fluoride to GLS glass caused deterioration in the thermal stability of the glass. A further advantage is that GLSOF glasses are non-toxic allowing fabrication of non-toxic fiber.

Experiments have demonstrated that GLSOF has thermal properties highly suitable for fiber drawing.

In addition, GLSOF can be made with lower levels of oxide incorporation than comparable GLSO, which is useful for fiber amplifier applications. This is because a GLSOF glass of a certain refractive index can be made with a lower oxygen content than a GLSO glass of the same refractive index. Since carrier lifetime scales with the sixth power of refractive index, this effect is highly sensitive.

The GLSOF glass may comprise:
40–9 mol %, 65–75 mol % or 67.5–72.5 mol % $Ga_2S_3$;
0–60 mol % $La_2S_3$;
1–60 mol % or 2–25 mol % $La_2O_3$; and/or
2, 3, 4, 5 or 6 to any of 60, 40, 25 or 20 mol % $LaF_3$.

The glass may further comprise a rare earth dopant, which may be present at a concentration of at least 50 ppm, 100 ppm or 200 ppm for example.

The dopant may advantageously be Pr. A GLSOF host glass has the unpredicted, surprising and important effect of shifting and broadening the $Pr^{3+}$ emission peak at 1.3 $\mu$m to provide a full width half maximum (FWHM) of 30% at 1.3 $\mu$m. These properties make $Pr^{3+}$:GLSOF of great interest for optical amplifiers and other devices and components for operation in the second telecommunications window.

According to a second aspect of the invention, GLSOF glass is incorporated into an optical waveguide, such as an optical fiber or planar waveguide, for example with a clad of Ga:La:S glass and a core of Ga:La:S:O:F glass. There may be provided an optical waveguide comprising a clad of a clad glass comprising gallium, lanthanum and sulfur and a core of core glass comprising gallium, lanthanum, sulfur, oxygen and fluorine. More specifically, a second aspect of the invention is directed to an optical waveguide comprising gallium sulfide and lanthanum oxide, and a core of glass comprising gallium sulfide, lanthanum oxide and lanthanum fluoride.

The core glass may have a higher mol % of gallium sulfide than the clad glass.

The core glass may have a lower mol % of lanthanum oxide than the clad glass.

The core glass may comprise at least 2 mol % lanthanum fluoride. The clad glass may also comprise lanthanum fluoride. The core glass may have a higher (or lower) mol % of lanthanum fluoride than the clad glass.

According to a third aspect of the invention there is provided an optical fiber preform comprising a core and a clad, wherein the clad comprises a clad glass comprising:
(a) gallium sulfide
(b) lanthanum oxide
the core comprises a core glass comprising:
(c) gallium sulfide
(d) lanthanum oxide and
(e) lanthanum fluoride.

The clad glass of the preform may further comprise lanthanum fluoride.

According to a fourth aspect of the invention there is provided a method of fabricating an optical fiber, comprising:
(a) providing a sample of glass comprising gallium sulfide, lanthanum oxide and lanthanum fluoride; and
(b) drawing the sample into an optical fiber.

In one embodiment a rod-in-tube technique is used in which the sample of glass is provided as a solid rod which is arranged in a glass tube prior to drawing.

In another embodiment a disc extrusion process is used in which the sample of glass is provided as a first disc and arranged adjacent a second disc of a further glass, the drawing comprising extrusion of the first and second discs through an extruder. The term disc here is used following common usage in the art. It will however be understood that the physical shape of the glass "discs" need not conform to any particular shape, it only being significant to arrange the two glasses one above the other adjacent the extruder.

In a specific embodiment, the core is holey, comprising a plurality of holes extending along the optical waveguide. For example, the optical waveguide may be a holey fiber with a holey core and/or cladding. The plurality of holes may have a characteristic period in at least one direction.

In other embodiments, other processes may be used for GLSOF fiber fabrication.

GLSOF can be used for a number of applications. GLSOF fiber may be used in non-linear devices and fiber amplifiers for telecommunications, for example. Devices based on third order optical non-linear processes can be made. GLSOF glasses show large intensity dependence on refractive index without appreciable linear absorption at the optical communications wavelength. This is required for all-optical switching.

BRIEF DESCRIPTION OF THE DRAWINGS

For a better understanding of the invention and to show how the same may be carried into effect reference is now made by way of example to the accompanying drawings in which:

FIG. 6B shows in schematic section a first step in extrusion fabrication of a GLSOF optical fiber;

FIG. 6C shows in schematic section a second step in extrusion fabrication of a GLSOF optical fiber;

FIG. 8 shows a GLSOF fiber used for delivering an infrared laser output beam;

DETAILED DESCRIPTION

I. Preparation of Raw Materials

Figure 1:
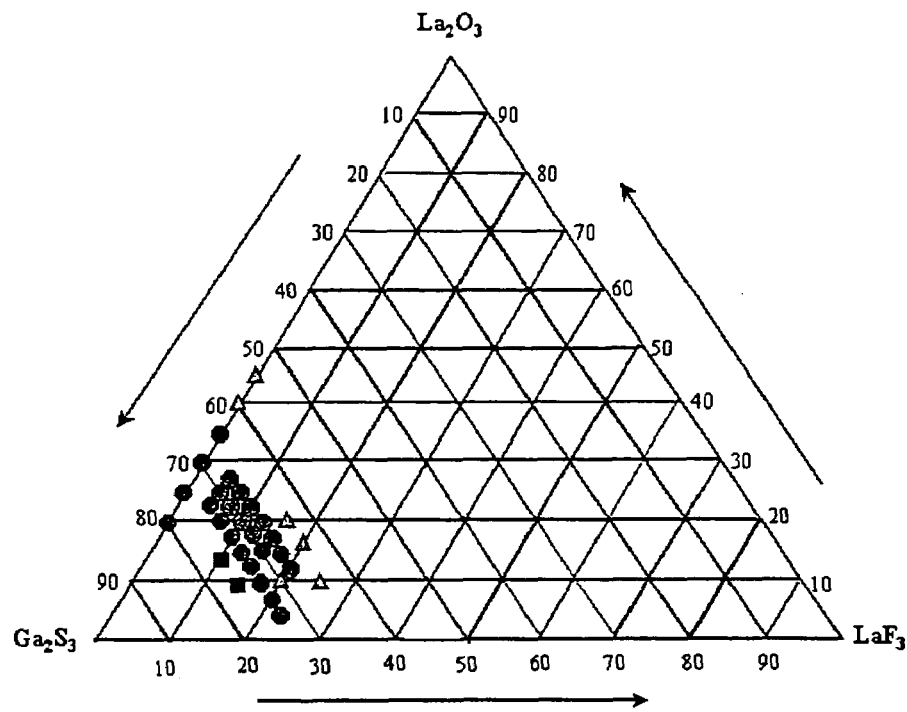
FIG. 1 shows the glass formation region of GLSOF.

GLSOF glass is produced by melting a mixture of gallium sulfide, lanthanum oxide and lanthanum fluoride. Optionally, lanthanum sulfide could also be included. Other modifiers can also be added to change the properties of the glass e.g. oxides or oxide-fluorides. Commercially available gallium sulfide, lanthanum oxide and lanthanum sulfide are usually specified to no better than 99.999% purity. In the case of gallium sulfide, commercially available material is usually predominantly of the $Ga_2S_3$ phase, although other phases such as GaS may be present. In some cases this purity is with respect only to metals and other unquantified impurities such as oxides, water, silica and carbon are present in large quantities (<50 ppm). In fact, many sulfides can contain up to 5% of the oxide from which they were synthesized. Even in the best commercially available materials up to 20 ppm of transition metal impurities are commonplace. Such levels of impurity result in extrinsic losses due to absorptions of over 20 dB/m from the raw materials used in the glass. The necessity to purify raw materials and thus eliminate transition metal impurities and reduce $OH^-$ content becomes evident. The presence of strong absorption peaks between 1–3 $\mu m$ is attributed to the transition metals Fe, Cr & Ni, as measured by Fourier transform infrared (FTIR) spectroscopy. The loss in the 1–3 $\mu m$ region is a combination of absorption from transition metal impurities and scattering effects. Transition metal absorptions in GLS glasses have been measured by intentionally doping the glass with transition metals, to identify individual contributions of transition metal ions to the material loss. In the 3–5 $\mu m$ region the absorption comes from $OH^-$, $SH_-$ and carbon impurities. An absorption peak at 2.9 $\mu m$ is due to the $OH^-$ content. It is anticipated that purification of starting materials will decrease the loss considerably by reducing absorption from transition metals and also diminishing the number of nucleation sites. There are many well-developed industrial methods for producing ultra-high purity materials from relatively low grade starting stock. However, these methods tend to be best applied to the production of high purity elemental or single-phase materials.

Gallium Sulfide Preparation

Synthesis of gallium sulfide involves reacting a precursor, metallic gallium for example, with a sulfurising agent, at high temperature. However, bulk sulfur is a difficult material to handle for conversions. The high vapor pressure of sulfur (with low boiling point of 444.6° C.) would require low synthesizing temperatures. However, most processes are carried out at temperatures greater than 800° C. Conversion in a sealed ampoule would prevent sulfur loss during the process, but presents significant difficulties such as preventing the ampoule exploding under the vapor pressure of sulfur, making the reaction go to completion and maintaining purity. If the reactants and products are sealed in an ampoule, any impurities present are also sealed in and are carried into the raw materials. Impurities would not arise from the sulfur, as it can be made to high levels of purity, however the constant contact with the ampoule walls at high temperature could lead to dissolution of the ampoule, and contamination. Using a flowing gas system eliminates these problems. A flowing system sweeps the by-products of reaction out of the hot zone, preventing them from reacting, and shifts the position of equilibrium by as much as 100% to favor the sulfurized product. Using high purity $H_2S$, it is possible to convert almost any precursor to a sulfide, depending on the temperatures available. This gives a very wide range of possibilities for potential precursors; and solves the problem of sulfides not lending themselves well to conventional purification techniques. The key then to producing high purity raw material is to convert the high purity precursor materials to the sulfides without introducing any impurities.

Conversions were carried out using a vitreous carbon crucible to hold the material. The crucible had previously been acid etched, rinsed and dried for more than 24 hours. The crucible was then transferred from the glovebox to the conversion apparatus in an atmosphere sealed transfer pod. The crucible and the silica tube hosted in the conversion apparatus were heated to 1000° C. under flowing argon for 24 hours. The crucible, which is now baked-out, is subsequently transferred back into the glovebox via the transfer pod and loaded with gallium (Ga) metal of 99.99999% purity. The material-loaded crucible is then transferred back to the conversion apparatus via the transfer pod. The material was heated at a rate of 20° C. $min^{-1}$ to the required temperature, typically 1000° C., and then $H_2S$ was introduced. Typical period of synthesis is for 36 hours. The table below shows the impurity levels of a typical gallium to gallium sulfide conversion, as measured by glow discharge mass spectroscopy (GDMS).

| The impurities in 7N gallium (precursor) and the gallium sulfide made from it. | | | | | | | | | | | |
|---|---|---|---|---|---|---|---|---|---|---|---|
| ppm wt % | Fe | Cr | Ni | V | Mn | Cu | Ti | Co | Al | Mg | Na |
| Gallium Precursor | 0.0057 | 0.0018 | 0.0053 | <0.0005 | <0.0005 | 0.039 | <0.001 | <0.0005 | 0.009 | 0.002 | 0.035 |
| Gallium Sulfide Product | 0.08 | 0.03 | 0.28 | <0.05 | <0.05 | <0.01 | <0.01 | 0.02 | 0.11 | 0.03 | 0.04 |

Although certain impurity levels did rise during the conversion process, contamination levels of transition metals were significantly less than 1 ppm. Some contamination was likely, particularly in the form of Fe, Ni, and Cr as they are major constituents of stainless steel, which make up part of the pipe work and valves in the sulfide conversion apparatus.

The OH⁻ absorption peak at 2.9 $\mu$m is a substantial feature in the transmission spectrum of GLS based glasses and was used to determine the OH⁻ content of the glasses and raw materials. In bulk glass samples, the size of the OH⁻ peak can be determined by using a Fourier Transform Spectrometer (Perkin Elmer system 2000). The powdered raw materials had to be incorporated into a KBr binder and then pressed into a transparent pellet before the transmission spectrum could be taken. A background of an undoped KBr pellet was used to correct the spectrum for interface reflections and any OH absorption from the KBr itself. In a typical pellet the material of interest was diluted approximately fifty times to give a transparent sample. Samples were normalized for thickness and dopant concentration. The KBr used was of spectroscopic (FTIR) grade and was kept and pressed in a nitrogen-purged glovebox. This method allowed for quantitative measurement of OH⁻ impurity levels in the raw material as a function of processing conditions. It has been typically observed that less than 1 ppm of OH⁻ is present in the fabricated Ga:La:S glasses.

Lanthanum Fluoride Preparation

Lanthanum fluoride (LaF₃) could be obtained in non-hygroscopic form relatively easily. Strizhkov [13] found that lanthanide fluoride could be dehydrated by heating to 500–600° C., under which conditions no decomposition to the oxide took place. Their results also suggested that water molecules can occupy a defect in the crystal structure which can only be removed by heating to >800° C., above which not only is the water removed, but the crystal structure is re-ordered rendering the fluoride non-hygroscopic. This has obvious advantages for preventing OH⁻ contamination during subsequent processing of the fluoride for GLS glasses.

Purification of lanthanum fluoride from transition metals was performed by heating the powders to 1400° C. in a ceramic tube. A typical process was to heat the LaF₃ under flowing argon (500 ml min⁻¹) to 400° C. at 3° C. min⁻¹ and hold for 8 hours, then heat to 800° C. at 3° C. min⁻¹ and hold for 8 hours, before heating at 3° C. min⁻¹ to 1350° C. and holding for 12 hours. The results of this treatment on the transition metal content of the material are shown in table 1. It can be seen that the starting quality of 4N LaF₃ (anhydrous) material was quite good (control sample), except for levels of transition metals.

| | Fe | Cr | Ni | V | Mn | Cu | Ti | Co | O | Si | Al | Mg | Na |
|---|---|---|---|---|---|---|---|---|---|---|---|---|---|
| Control | 1.3 | 1.3 | 0.2 | 0.23 | 0.01 | <0.05 | 0.16 | <0.05 | <=180 | 23 | 7.1 | 0.09 | 1.3 |
| Pure 30 | 0.08 | 0.07 | 0.7 | <0.01 | <0.01 | 1.0 | 0.06 | <0.05 | <=6000 | 3.6 | 0.22 | 0.15 | 0.22 |

Comparison of a control sample of lanthanum fluoride (4N) and material purified by heat treatment (Pure 30).

After purification it can be seen that all the transition metals of interest have been reduced to ultra-trace quantities, and the non-volatile impurities (the silica, alumina, magnesia, and presumably the sodium fluoride) have been reduced to below the required levels with only the oxide level increased.

Lanthanum Oxide Preparation

The third component required for glass melting was La₂O₃. The level of oxide in the glass had profound effects on its thermal stability with respect to fiber drawing. It was found that a minimum level of around 0.5 mol % was required, without which glass would not form. For low oxide glasses 2 mol % was routinely added. Hence the purity of the La₂O₃ was not initially as significant a concern as that of the other glass constituents. However, with the high purity of both the gallium and lanthanum sulfides available as a result of this work, the focus shifted onto the impurities that were included with the lanthanum oxide. The table below lists the relevant impurities contained in the La₂O₃ batch used for the majority of this work.

| | Fe | Cr | Ni | V | Mn | Cu | Ti | Co | Si | Al | Mg | Na |
|---|---|---|---|---|---|---|---|---|---|---|---|---|
| Control | 1.1 | 0.09 | 0.19 | 0.08 | 0.05 | 0.45 | 0.14 | <0.03 | 13 | 2.8 | 0.94 | 5.1 |
| LaCO14 | 0.68 | 0.05 | 0.03 | 0.05 | 0.04 | 0.05 | 0.26 | <0.01 | 9.4 | 1.4 | 0.24 | 1.1 |

Comparison of a control sample of lanthanum oxide (4N) and material purified by heat treatment (LaCO14).

Purification of lanthanum oxide from transition metals was performed by heating the powders to 1550° C. in a ceramic tube. A typical process was to heat the La₂O₃ under flowing argon (500 ml min⁻¹) to 500° C. at 3° C. min⁻¹ and hold for 12 hours, then heat to 1000° C. at 3° C. min⁻¹ and hold for 12 hours, before heating at 3° C. min⁻¹ to 1550° C. and holding for 12 hours. The results of this treatment on the transition metal content of the material are shown in table 2. It can be seen that the starting quality of 4N La₂O₃ (anhydrous) material was quite good (control sample), except for levels of transition metals.

After purification it can be seen that all the transition metals of interest have been reduced to below 1 ppm levels and the non-volatile impurities (the silica, alumina, magnesia, and presumably the sodium fluoride) have been reduced to below the required levels.

II. GLSOF Glass Melting

In the fabrication of GLSOF glass, we have modified the GLS structure by replacing lanthanum sulfide ($La_2S_3$) with lanthanum fluoride ($LaF_3$) and lanthanum oxide ($La_2O_3$). Lanthanum fluoride advantageously possesses relatively low vapor pressure (m.p. 1493° C.) and influences the temperature-viscosity behavior favorably [2].

The GLSOF glasses were made by quenching from a melt. However, where other chalcogenides are melted in sealed ampoules containing the required amounts of elemental precursors [1], GLSOF glasses are melted from prepared batches of gallium sulfide, lanthanum oxide and lanthanum fluoride. (Other glass modifiers may be used based on at least one of: oxides, halides or sulfides of metals selected from the group: sodium, aluminum, potassium, calcium, gallium, germanium, arsenic, selenium, strontium, yttrium, antimony, indium, zinc, barium, lanthanum, tellurium and tin.) Since these elemental precursors are non-volatile at the glass melting temperature, melting in an open (argon purged) atmosphere facilitates the removal of volatile impurities particularly $OH^-$. Batches of powders are placed in a vitreous carbon crucible and melted in a silica tube furnace at 1150° C. for up to 24 hours, depending on the batch size. The molten gallium sulfide fluxes the lanthanum precursors, incorporating them into the liquid at temperatures much lower than their melting point. After a melt is quenched, the glass is then annealed at temperatures slightly below $T_g$ (glass transition temperature). This is routinely done at 530° C. for about 24 hours. The process of annealing removes residual stresses and thermal shock in the glass, which is introduced during the quench. This is important as annealing makes the glass suitable for cutting and polishing. Typical batch sizes for test samples (suitable for thermal analysis or spectroscopy) are 20 g, while for fiber production, 170 g samples are used from which rods or tubes of glass can be cut and polished.

The table below describes the composition of three example glasses investigated.

Compositions of GLS-Fluoride (in mol %) investigated

| Sample No. | $Ga_2S_3$ | $La_2S_3$ | $La_2O_3$ | $LaF_3$ | ΔT Stability | Reproducibility |
|---|---|---|---|---|---|---|
| LD992-7 | 65 | 13 | 2 | 20 | Fair | Difficult |
| LD1000-2 | 65 | 10 | — | 25 | Poor | Difficult |
| LD1009-3 | 70 | — | 20 | 10 | Good | Easy |

Over 130 melts were carried out in the manner described below to determine feasible composition ranges, and these glasses were thermally tested. DTA analysis of LD992-7 showed an improvement in thermal properties over GLS. DTA analysis of LD1009-3 indicated very good thermal properties. On the other hand, reproduction of LD992-7 proved to be difficult which could be attributed to the different batches of raw materials used to produce LD992-7. LD1000-2 was batched and subsequently analyzed. It was interesting to note that the lack of $La_2O_3$ in LD1000-2 caused a remarkable decline in the thermal properties. Work by S. P. Morgan et. al. [2] on doping of the GLS matrix showed that it was not possible to incorporate more than 3 mol % of $LaF_3$ into GLS. By contrast, our surprising results have demonstrated that it is possible to add up to 25 mol % fluorine, in the form of $LaF_3$, into GLSO, i.e. into a compound of GLS and the oxide $La_2O_3$. Furthermore, the addition of $LaF_3$ produced glass that was noticeably paler in color indicating blue shifting, where the electronic edge shifts towards the UV. This property proves useful for active applications when pumping of rare-earth ions in the visible is required.

The glass formation region for GLSOF has been carefully evaluated with compositional variations and is shown in FIG. 1. It has been conclusively identified that an area of glass formation as indicated by circles, is a new and previously undiscovered glass formation region. The triangles indicate partially crystallized material and the squares completely crystallized material.

Most crystalline solids can be made amorphous if cooled rapidly from above its melting point; for example amorphous metals require cooling of the order of $10^6$ K/s for formation. However, they are classed as glasses if a glass transition temperature, $T_g$ exists.

Certain important terms for discussing the thermal properties of glass are listed in the table below.

Important terms for discussing the thermal properties of glasses

| Term | Definition |
|---|---|
| $T_x - T_g$ | The separation of the onset of crystallization and the glass transition temperature. |
| $T_p - T_x$ | The (half) width of the crystallization peak. |
| $T_m - T_p$ | The separation of the melting and peak crystallization temperature. |
| $T_n - T_x$ | The separation of the actual drawing temperature, and the onset of crystallization. |

Glasses will show a continuous decrease in volume as they are cooled from high temperatures through a super cooled region until their $T_g$ is reached. This is where the coefficient of thermal expansion changes (usually decreases), but remains continuous. $T_g$ is the intersection between the glass solid and glass liquid phases. $T_g$ is proportional to the cooling rate, increasing with quicker cooling rate. Unlike glass, crystalline materials exhibit a discontinuity in the volume of the material upon passing through the melting point. The lack of such a discontinuity in glasses is due to their viscoelastic property where the viscosity of the glass constantly increases upon cooling. The viscosity becomes so great that the mass transport for crystallization has such a large time constant that crystallization is effectively prevented, hence the production of a glassy matrix.

Figure 2:
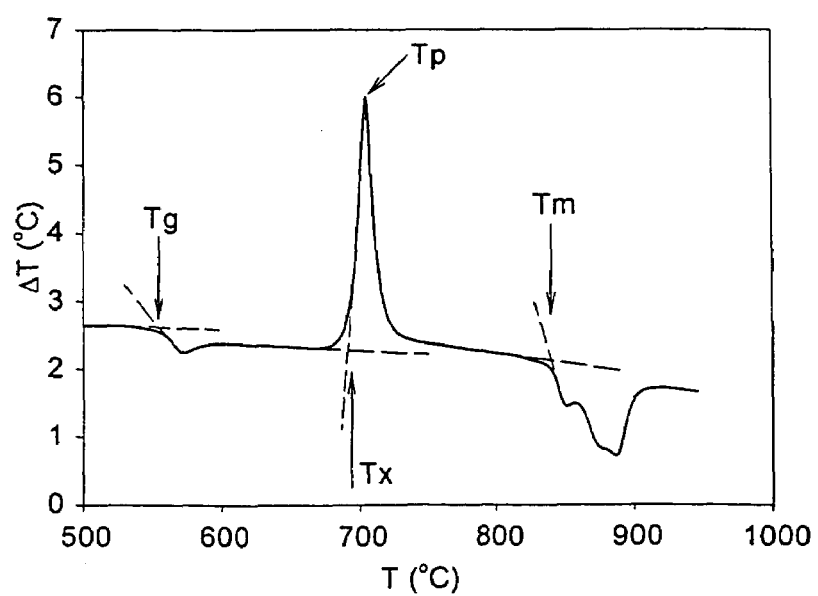
FIG. 2 is a typical differential thermal analysis (DTA) plot for a glass of the GLS family.

Glasses can, however, devitrify if held above $T_g$ for long enough, the time and temperature for which is determined by the composition of the glass. $T_x$ depicts the onset of crystallization and the peak crystallization temperature is denoted as $T_p$ as shown in the "typical" differential thermal analysis (DTA) curve given in FIG. 2. As heating continues, any crystals may begin to melt. The onset of melting is denoted $T_m$ and is indicated in FIG. 2 as an endothermic event.

There are also three defined temperatures in terms of the viscosity of the glass. The strain point is the temperature at which the viscosity of the glass is approximately $10^{14.6}$ poise. At this viscosity, the glass will tend to flow rather than fracture, and stresses will be relieved in hours. The annealing point is the temperature at which the viscosity is approximately $10^{13.4}$ poise, and stresses in a glass at this temperature will be relieved in minutes. The final temperature is the softening temperature which is defined as the temperature at which the glass has a high viscosity of ~$10^{7.6}$ poise. At or above this temperature the glass can be drawn into fiber.

Several techniques exist for the measurement of these characteristic temperatures. Differential scanning calorimetry (DSC) and differential thermal analysis (DTA) are the most common. The DTA technique is used for thermal characterization of Ga:La:S glasses, simply because it has a higher upper characterization temperature as opposed to DSC. The instrument used in the measurements discussed below is the Perkin-Elmer DTA7. The measurement principle is based on the difference in temperature between two alumina cups, both of which are at the center of a uniform temperature furnace. One cup holds an inert material (alumina powder) and the other holds a small piece of glass (typically 15±5 mg), contained in alumina powder to provide good thermal contact. The furnace is ramped up at 20° C./min; any changes in the glass that are endothermic (melting event) or exothermic (crystallization event) heat are recorded as a function of temperature. In this way, $T_g$, $T_x$, $T_p$ and the melting point $T_m$ can all be measured. A criterion for a glass to allow good fiber drawing is a large separation between $T_x$ and $T_g$. The half-width of the crystallization peak $T_p$-$T_x$ should also be large, and the separation of $T_m$ and $T_p$ should be small.

This can readily be understood in terms of what is happening to the glass. $T_g$ determines the intersection of glass solid and glass liquid phases; indicating that any fiber drawing occurs at a temperature above $T_g$. With small values for $T_x$-$T_g$, the material will tend to crystallize at or before drawing, hence making fiber drawing impractical. This value may also be used as a guide to the maximum working temperature of the glass held above $T_g$, before it eventually crystallizes.

Glasses with a large half-width of the crystallization peak ($T_p$-$T_x$) exhibit a weak crystallization event. Although some crystallization may take place, the process is not ot as rapidly as in the case where the peak is strongly exothermic and narrow. The latter indicates one clearly defined crystalline event, which completes very quickly once started, potentially making fiber very difficult to draw, even more so if $T_x$-$T_g$ is small. A wider peak indicates the possibility of more than one crystal event.

When $T_m$-$T_p$ is small, it can be understood that the viscosities at $T_m$ and $T_p$ are close, with the viscosity at $T_m$ lower than that at $T_p$. This suggests that the viscosity of the glass at the crystallization temperature will be low (viscosity of liquid ~$10^1$ poise); however for fiber drawing we require a higher viscosity ($10^4$–$10^6$ poise), allowing drawing temperatures significantly lower than the onset of crystallization. If viscosity data are known, then the actual separation between the drawing temperature and the onset of crystallization can be calculated and serves as a useful indicator of fiber drawing potential. Through careful optimization of the composition, significant gains in thermal stability can be achieved with correspondingly enhanced fiber drawing properties.

Another method of determining glass stability is through the Hruby factor ($H_r$) as given by the following equation:

$$H_r = \frac{T_x - T_g}{T_m - T_x}$$

If a glass has $H_r$ factor of less than 1 it is considered to be highly unstable (prone to crystallization). If the $H_r$ factor was equal to or greater than 1 it can be considered to be generally stable. The larger the $H_r$ factor, the more stable the glass. It must be stated that the measure of glass stability with $H_r$ is not a rigid guideline but only serves to provide an idea. Rate of crystallization depends upon sample size, shape, surface conditions and a host of other external parameters.

A thermal comparison between GLS, GLSO and optimized GLSOF ($70Ga_2S_3$:$12.5LaF_3$:$17.5La_2O_3$) is shown in the table below.

Thermal Comparison between GLS, GLSO and GLSOF

| ΔT (° C.) | GLS (° C.) (65:32:3) mol % | GLSO (° C.) (70:30) mol % | GLSOF (° C.) (70:12.5:17.5) mol % |
|---|---|---|---|
| $T_x$ - $T_g$ | 120 | 190 | 170 |
| $T_p$ - $T_x$ | 24 | Not measurable | 33 |
| $T_m$ - $T_p$ | 104 | Not measurable | 65 |

Upon examination of the DTA plots for GLS (FIG. 2A), GLSO (FIG. 2B) and GLSOF (FIG. 2F), it can be seen that GLSOF provides an increase in $T_x$-$T_g$ of 50° C. between GLS and GLSOF. However, $T_x$-$T_g$ is reduced by 20° C. in GLSOF compared with GLSO. What this indicates is that the temperature range for fiber drawing is narrowed, though with $T_x$-$T_g$ of 170° C. fiber drawing has proven easy and this was expected. Furthermore, in the case of GLS vs. GLSOF, a wider half-width of the crystallization peak indicates the crystallization event is a multitude of many smaller events and is thus less prone to crystallization during fiber drawing. Furthermore, a small ΔT (° C.) between the baseline thermal event and $T_p$ points towards a weak exothermic event. There also exists a small gap between the onset of melting $T_m$ and $T_p$, which indicates a viscosity very suitable for fiber drawing. This phenomenon, discussed further above, indicates improved glass stability. GLSO on the other hand has good thermal stability indicated by a crystallization peak too small to be measured by DTA.

Figure 2A:
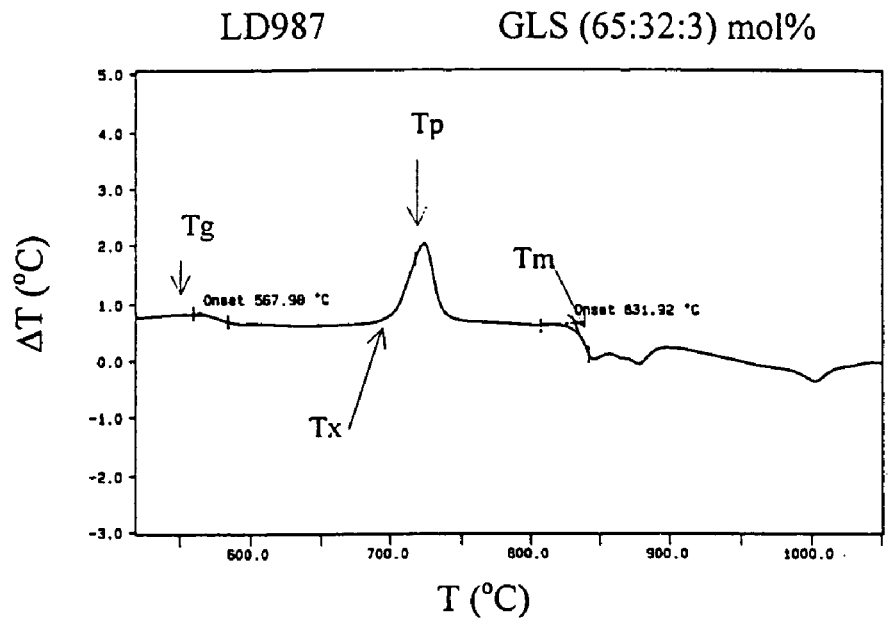
FIGS. 2A–2H are differential thermal analysis (DTA) plots for a number of glass compounds.
Figure 2B:
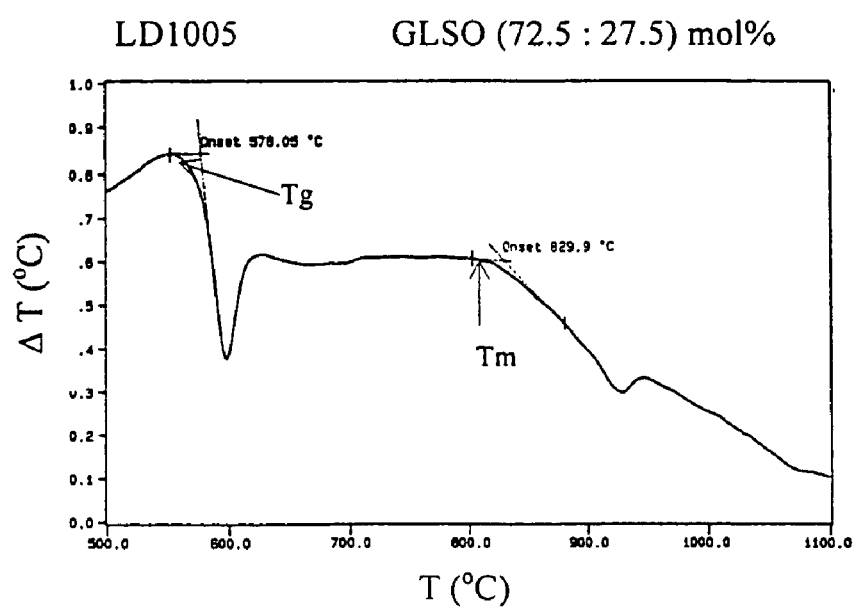
Figure 2C:
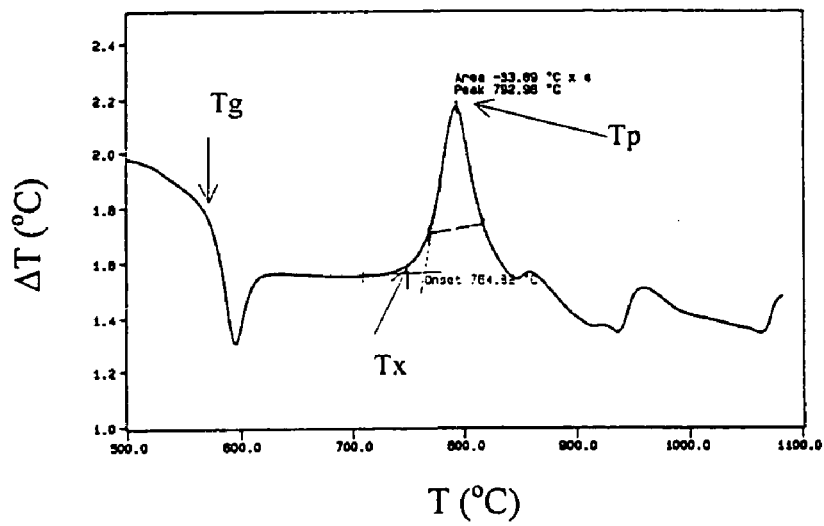
Figure 2D:
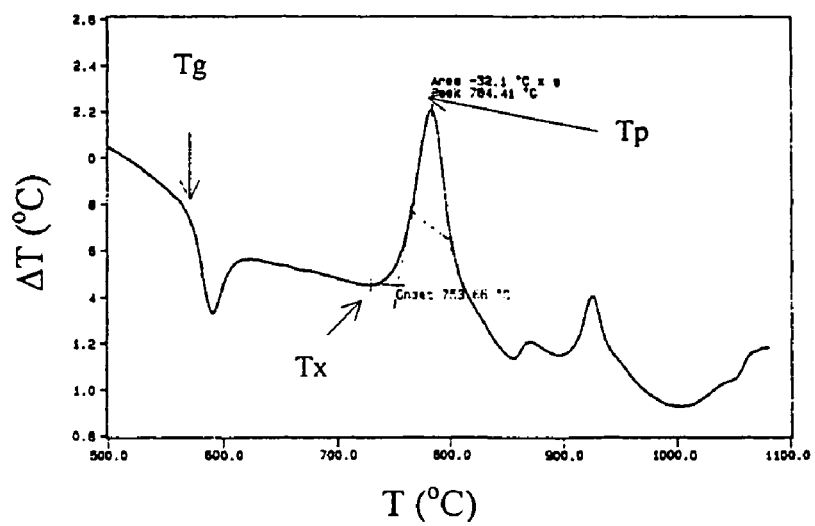
Figure 2E:
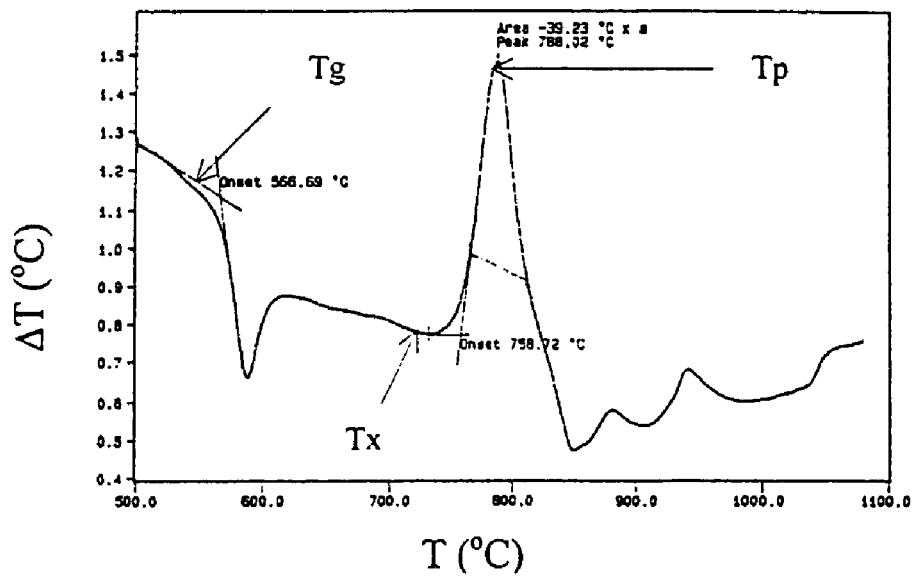
Figure 2F:
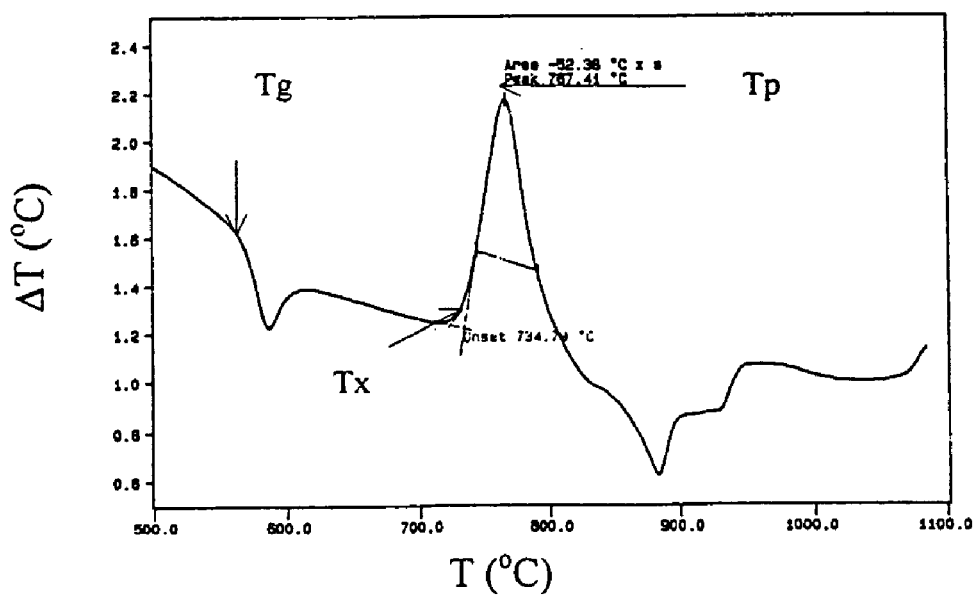
Figure 2G:
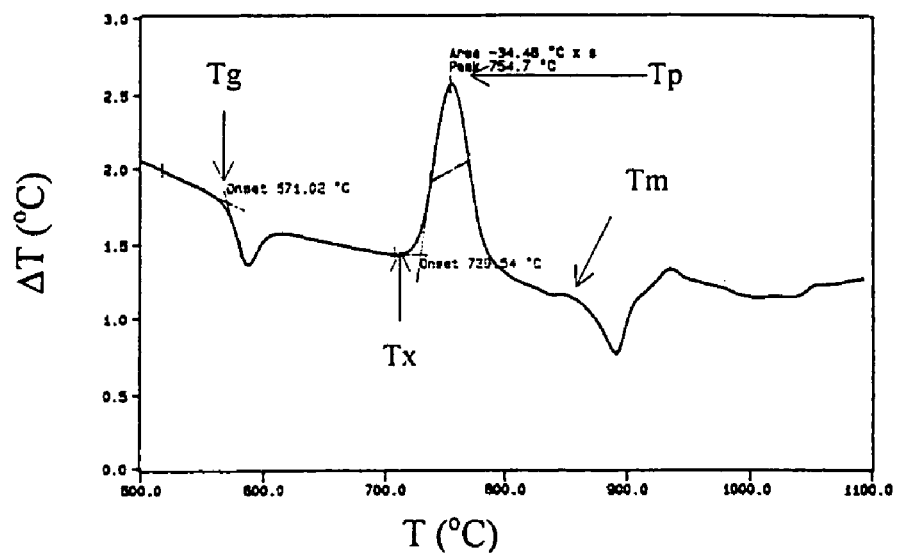
Figure 2H:
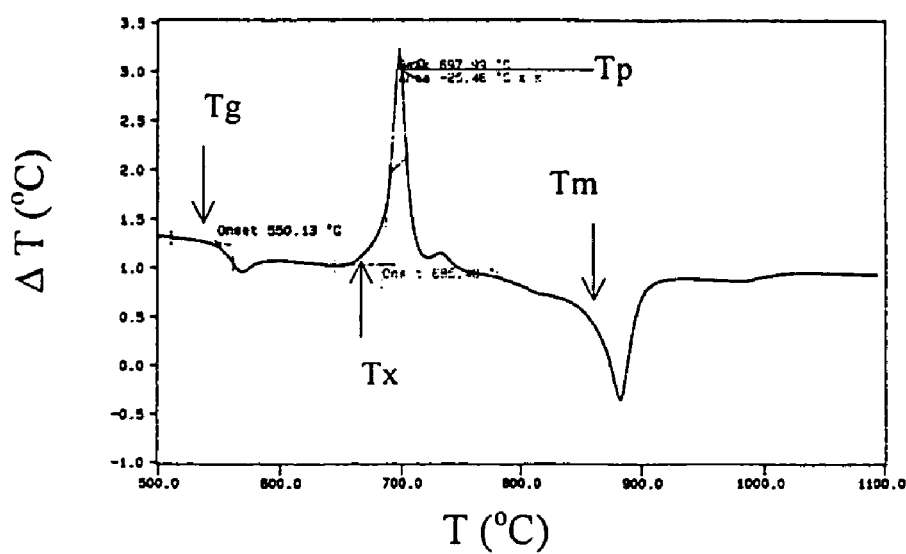

One can appreciate the fabrication difficulties involved in trying to draw fiber from GLS by analyzing the DTA plot for GLS (FIG. 2A). With small separation between $T_x$-$T_g$, there exists only a small temperature range for fiber drawing (~120° C.). The half-width of the crystallization peak $T_p$-$T_x$ (24° C.) is narrow, an indication that fiber drawn will be prone to crystallization. The large value for $T_m$-$T_p$ (104° C.) indicates large variations in viscosity during fiber drawing; a contributing factor to crystallization during fiber drawing.

The DTA plot for GLSO (FIG. 2B) shows a dramatic thermal improvement over GLS. There is no evidence of any strong crystallization events and fiber has been easily drawn from GLSO preforms. However, there is the high oxide content in GLSO fiber that can be detrimental to fiber amplifier performance. Furthermore, the high oxide content is potentially a strong contributor to the OH— peak at 2.9 μm.

GLSOF, with 10–15 mol % of $LaF_3$, has considerably less $La_2O_3$ as compared to GLSO. Although GLSOF seems slightly inferior to GLSO in terms of thermal stability, ease of fiber drawing from a GLSOF preform has proven successful. A total fiber yield of 200 m was drawn from a single extruded GLSOF preform. Observation of a piece of well-cleaved fiber under an optical microscope revealed a well-formed crystal free structure. With lower oxide content and fiber with lack of evident crystallization, GLSOF has the potential to provide active and passive devices.

FIGS. 2C–2H are DTA plots for GLSOF with varying quantities of LaF$_3$. It can be seen that increasing the content of LaF$_3$ and decreasing that of La$_2$O$_3$ in GLSOF has a detrimental effect on glass stability as measured by T$_x$-T$_g$ but a beneficial effect in respect of T$_m$-T$_p$.

This can be understood by results that show decreasing T$_x$-T$_g$ & T$_p$-T$_x$ with increasing T$_m$-T$_p$ for increased quantities of LaF$_3$ (see FIG. 3A discussed below). Values for T$_m$-T$_p$ are small, indicating that GLSOF is highly suitable for fiber drawing as there is little viscosity variation during fiber drawing. This thermal property is similar to that observed in fluoride doped glasses e.g. ZBLAN. In addition, there is a considerable increase in T$_x$-T$_g$ and widening of the crystal peak, T$_p$-T$_x$, as compared to GLS.

Figure 3A:
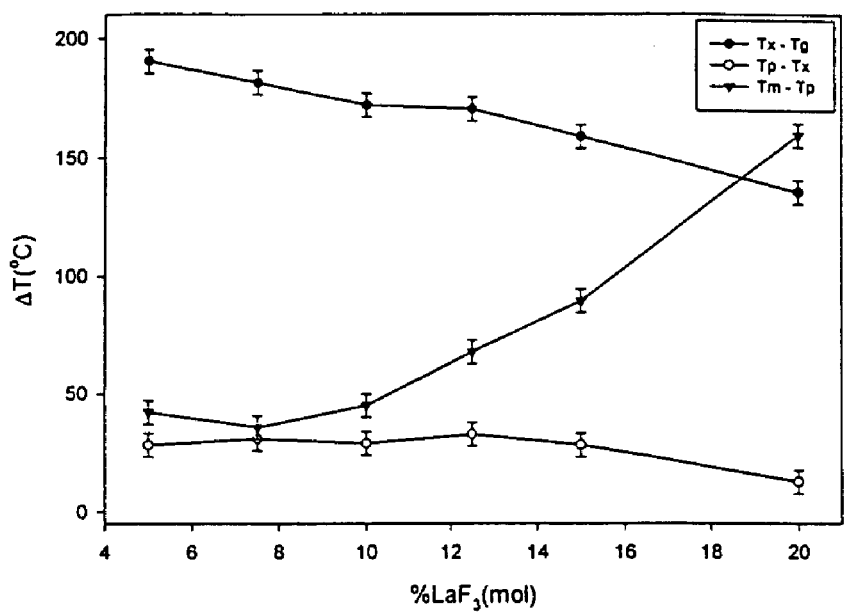
FIG. 3A shows the thermal properties of GLSOF glasses for a glass composition given by 70 $GaS_x$:x $LaF_3$:30-x $La_2O_3$.

FIG. 3A shows the thermal properties of GLSOF glasses for which the composition is given by 70 Ga$_2$S$_3$:x LaF$_3$:30-x La$_2$O$_3$. Analysis of the plot indicates that addition of between 7.5–12.5 mol % of LaF$_3$ seems to provide the best compromise in thermal stability.

Figure 3B:
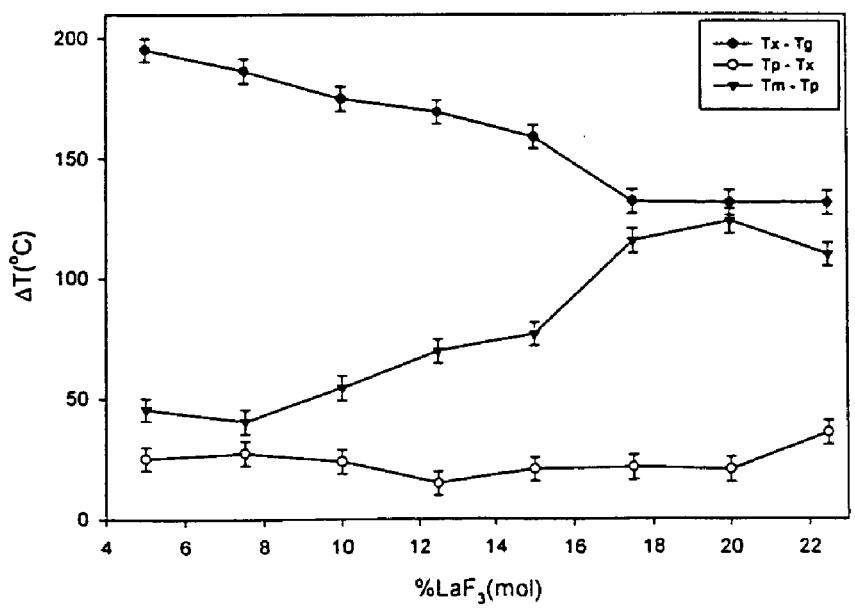
FIG. 3B shows the thermal properties of GLSOF glasses for a glass composition given by 72.5 $GaS_x$:x $LaF_3$:27.5-x $La_2O_3$.

FIG. 3B shows thermal properties for GLSOF glasses with glass composition given by 72.5 Ga$_2$S$_3$:x LaF$_3$:27.5-x La$_2$O$_3$. Addition of increased gallium sulfide to GLSOF would provide the core glass composition for a core-clad structure, as higher gallium sulfide content increases refractive index.

The batch composition consists of gallium sulfide (40–90 mol %), lanthanum oxide (0–60 mol %) and lanthanum fluoride (2–25 mol %) in the quantities indicated. During glass melting, a mass loss of between 7–12% is observed for a mixed batch containing quantities of lanthanum fluoride between 10–15 mol %.

III. Optical Properties of GLSOF Glass

1. Transmission Window

The short and long wavelength limits of the transmission window are the electronic and multiphonon absorption edges respectively. The absorption edges were measured for the glass compositions as shown in the table below, using thin slices of bulk glass measuring 2 mm±50 μm in thickness.

Glasses used in absorption edge measurements

| Glass Type | Molar Composition |
| --- | --- |
| GLS | 65Ga$_2$S$_3$:32La$_2$S$_3$:3La$_2$O$_3$ |
| GLSO | 70Ga$_2$S$_3$:30La$_2$O$_3$ |
| GLSOF | 70Ga$_2$S$_3$:10LaF$_3$:20La$_2$O$_3$ |
| GLSOF | 70Ga$_2$S$_3$:15LaF$_3$:15La$_2$O$_3$ |
| GNS | 68Ga$_2$S$_3$:32Na$_2$S |

Transmission spectra of the bulk glasses were measured between 400 nm–700 nm using a dual beam Perkin-Elmer Lambda 9 spectrophotometer. The spectrophotometer used a deuterium and tungsten lamp with a silicon detector. Infrared measurements were performed using a Fourier transform infrared (FTIR) spectrometer, model Perkin-Elmer System 2000. The FTIR light source was a broadband NiCr wire with a HgCdTe detector measured over the range 1 μm–10 μm in the FTIR spectrometer.

Figure 4A:
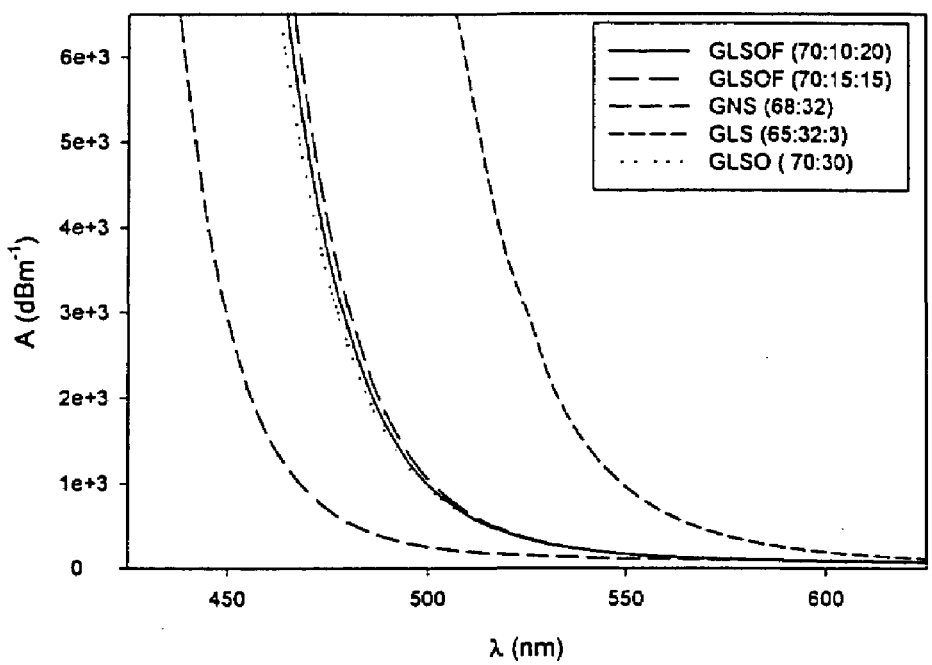
FIG. 4A shows the electronic edge for various gallium sulfide glasses.

FIG. 4A shows the visible edge of glasses listed in the above table as measured on the slices of bulk material. The maximum measurable absorption with the thickness of samples used was ~6×10$^3$ dBm$^{-1}$. GLSO & GLSOF have significantly better visible transparency than GLS. GNS exhibits good visible transparency with a visible edge of about 475 nm which seems superior to that of Ga:La:S glasses. However, as Na$_2$S is extremely hygroscopic, GNS glasses will exhibit strong OH— absorptions in the infrared.

Figure 4B:
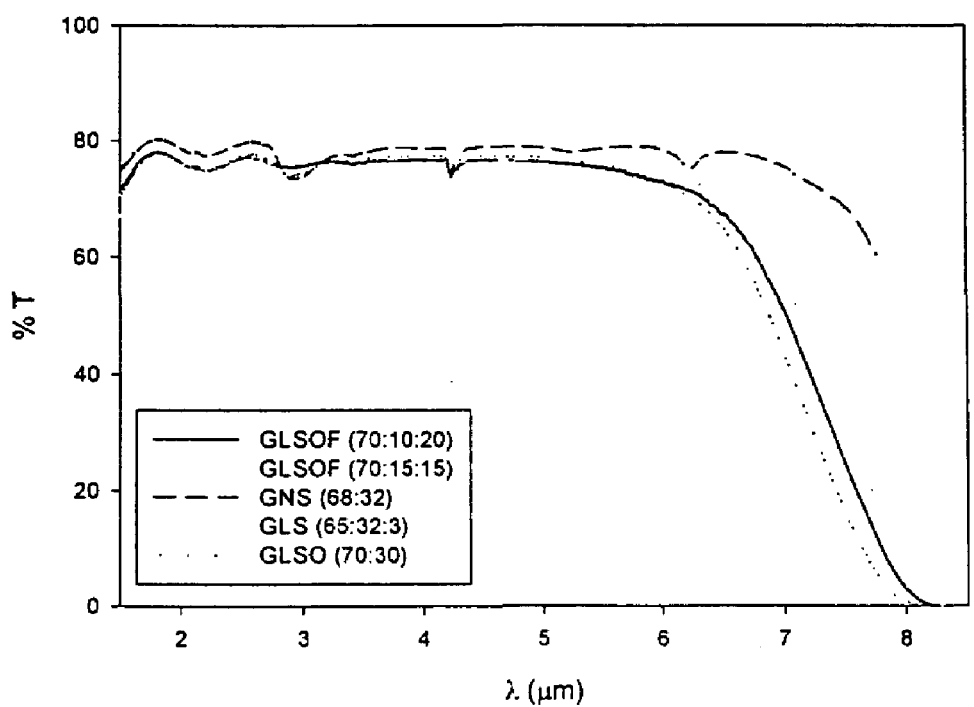
FIG. 4B shows the multiphonon edge for various gallium sulfide glasses.

FIG. 4B shows transmission in the long wavelength region. The GLSO & GLSOF multiphonon absorption bands begin at approximately 8 μm. In GLS glasses the multiphonon edge is shifted out to ~10 μm. The limiting factors in measuring attenuation in the FTIR region were a KBr beamsplitter and the intensity of the MIR source used in the FTIR for these measurements. In the short wavelength region, the attenuation is no longer just dominated by the multiphonon edge, but by a mixture of the edge, impurity absorptions and scattering.

2. Fiber Loss

Fiber was drawn from an extruded unpolished disc (GLSOF—70:10:20 mol %), fabricated from unpurified raw materials. A total of 200 m of fiber with nominal fiber diameter of 150 μm was drawn from a single preform measuring 9 mm in diameter and 100 mm in length. The fiber drawn did not suffer from crystallization and this was confirmed when a well-cleaved cross-section was viewed through an optical microscope.

Figure 4C:
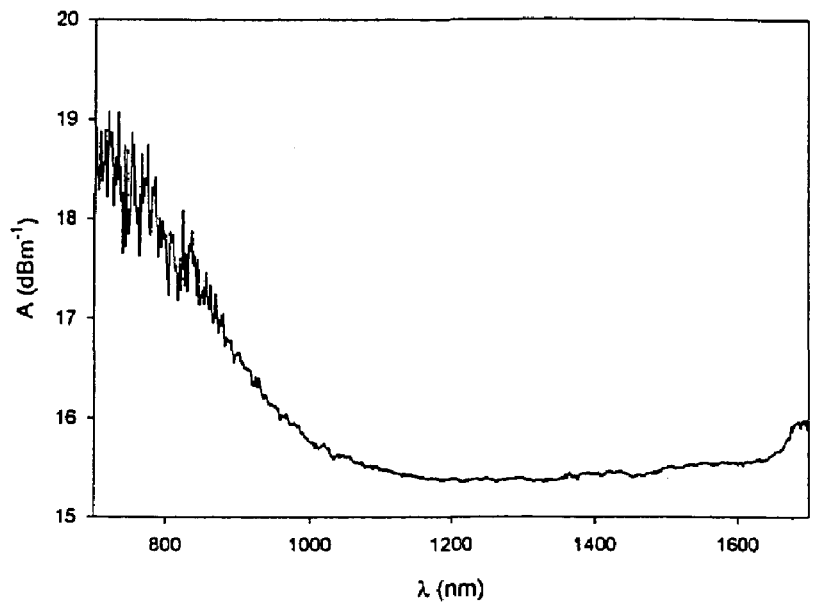
FIG. 4C shows the attenuation spectrum of unclad, uncoated GLSOF(70:10:20) fiber.

FIG. 4C shows the attenuation spectra for the fiber drawn. Fiber loss was measured using a standard cutback method using a white light source and optical spectrum analyzer with 10 nm step size. Measurements were done on unclad and uncoated fiber to eliminate sources of loss such as core-clad interface scattering and length of the cutback ensured that the dominant effect measured was due to the removal of this length of fiber over variability of the fiber cleaves. The fiber ends were cleaved a minimum of six times to ensure reproducibility, with measurements repeated a minimum of four times to reduce random errors. Fiber lengths used in measurements were of the order 1 m in length with cutbacks between 30–70 cm. The fiber was hand cleaved using a ceramic blade with the cleave having significant effects on the results.

Initial lengths of the fiber were long and hence gave noisy loss measurements due to the low intensity of the transmitted light and thus required long cutbacks. Errors in measuring the transmitted energy were typically reduced to 5% by repeating cleaves while checking for consistency. Loss measurements were also performed at a single wavelength (1.5 μm) using a laser source of good beam quality, confirming the loss at 1.5 μm to be ~15 dB/m. These losses are typical for fiber made from unpurified and unpolished extruded discs. Improvements in fiber loss are expected when polished preforms made from purified raw materials are drawn into fiber.

Figure 4D:
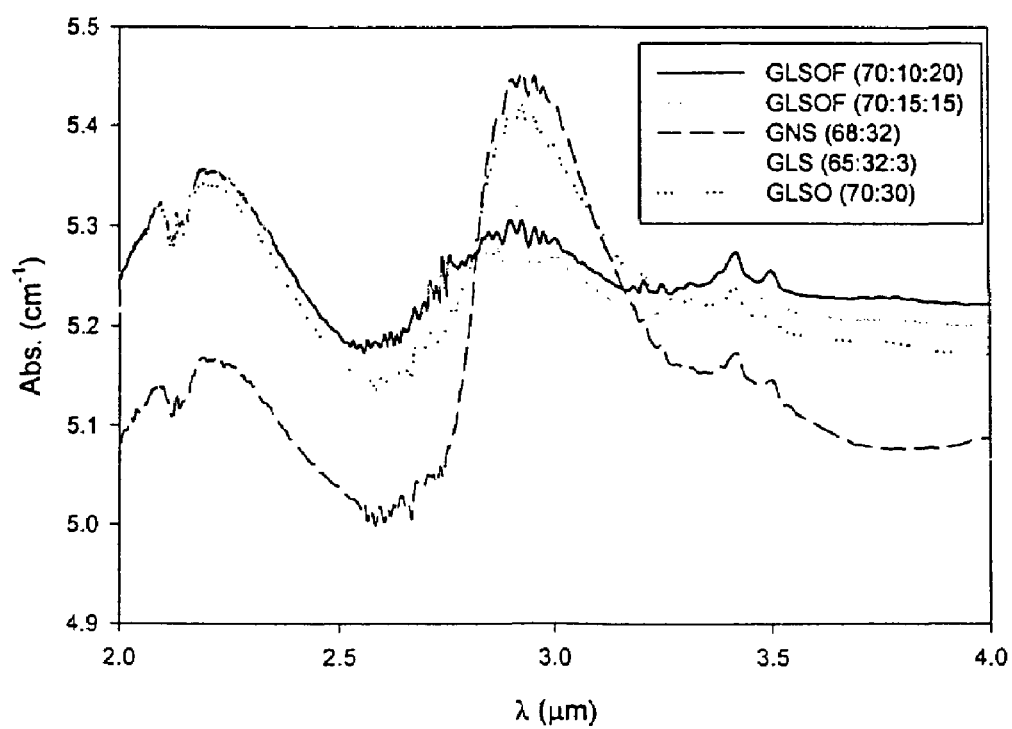
FIG. 4D is a graph plotting the absorption coefficient 'a' versus wavelength 'λ' to compare OH$^-$ peaks for various gallium sulfide glasses.

FIG. 4D shows a comparison of the OH— peak at 2.9 μm between different gallium sulfide glasses. The glasses have a hydroxyl (OH$^-$) peak that is either due to intentional addition of oxide as in the case of GLSO for thermal stability, or some form of oxide impurity required for glass formation. In both cases, the oxide content contributes to the OH$^-$ peak, however GLSO glasses have a stronger OH$^-$ absorption due to higher oxide content. In the case of GNS glasses, the strong absorption at 2.9 μm can be attributed to the severe hydroscopic nature of Na$_2$S. In GLSOF glasses there is a reduction of the OH$^-$ absorption at 2.9 μm, as is evident from the Figure. This is attributed to any hydroxyl groups present in the melt reacting with the fluoride ions as shown in the following equation:

$$OH^- + F^- \rightarrow O^{2-} + H$$

Overall, hydroxyl groups are liberated from the melt via formation of HF and formation of oxide. Since the hydroxyl levels are expected to be in the sub-parts-per-million (ppm) range, then only small levels of oxide will be formed. Absorptive losses arise from infrared-absorbing impurities in the starting materials and glass; the main contaminants being OH⁻ and transition metals. The OH⁻ infrared absorption peak at 2.9 μm has a magnitude of 10 dB/m and covers a substantial part of the spectrum stretching between 2.8–3.4 μm. The reduction of OH⁻ peak for GLSOF glasses would result in improved transmission in the mid-infrared. Therefore, it is critical to use anhydrous chemicals and melt under dry and inert conditions.

3. Optical Properties of $Pr^{3+}$ Doped GLSOF

A most interesting result to emerge from the work on GLSOF is the shift and the broadening of the $Pr^{3+}$ emission peak ($^1G_4 \rightarrow {}^3H_5$ transition) at 1.3 μm.

Figure 5:
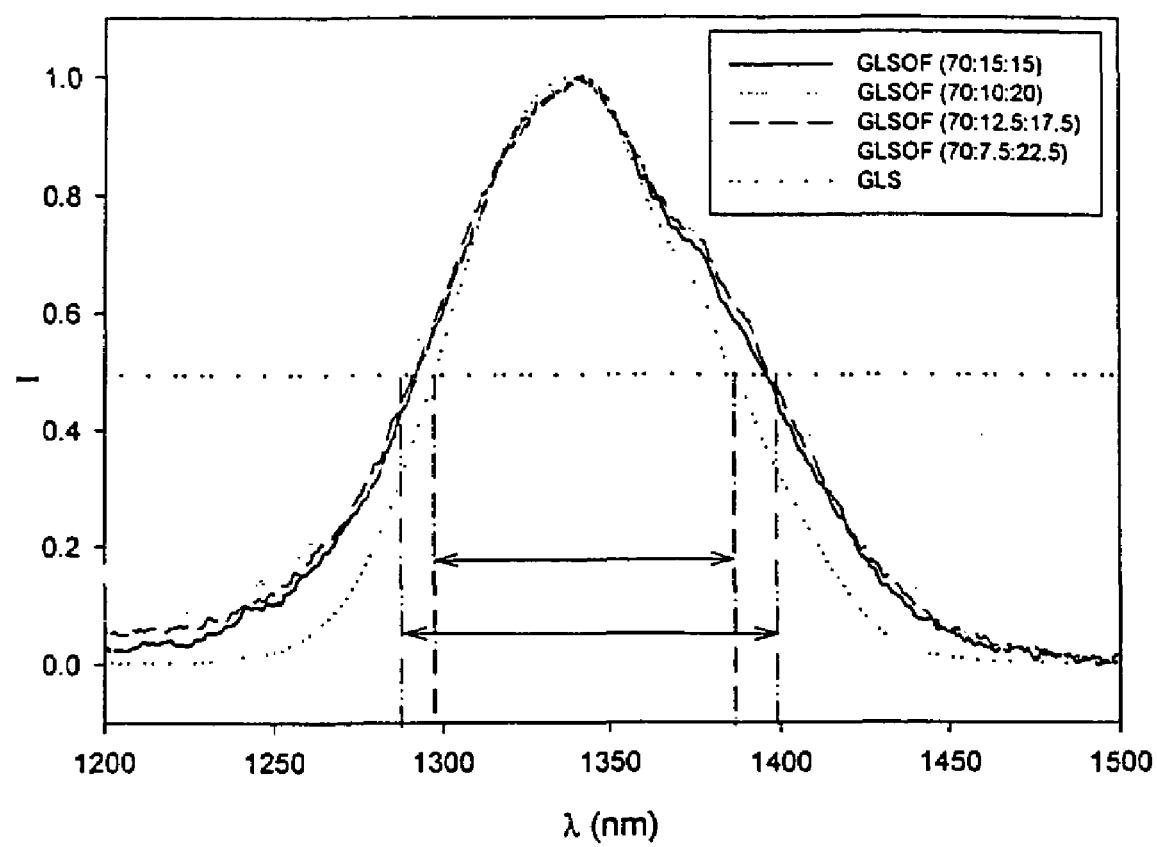
FIG. 5 is a graph plotting the intensity 'I' of fluorescence emission at around 1.3 $\mu$m for GLS and for different GLSOF glasses.

FIG. 5 shows the fluorescence spectra of $Pr^{3+}$-doped GLSOF and GLS glass. The glasses were doped with low levels of $Pr_2S_3$ (500 ppm weight %) to ensure that concentration effects could be ignored in the measurements. Each sample is pumped at 1010 nm with a Ti-Sapphire laser and data acquisition performed in steps of 1 nm. Broadening of the emission spectrum is observed; with up to 30% at FWHM for GLSOF glass with 10 mol % of $LaF_3$. 1.3 μm peak emission for GLS is at 1.335 μm whereas the peak emission for GLSOF with 10 mol % $LaF_3$ is at 1.329 μm. This advantageous property is useful in development and realizing efficient fiber amplifiers for the $2^{nd}$ telecommunications window. The bulk samples used in the measurements were 65 $Ga_2S_3$:32 $La_2S_3$:3 $La_2O_3$ for GLS and 70 $Ga_2S_3$:x $LaF_3$:30-x $La_2O_3$ for GLSOF(x=7.5–15) glasses.

A reason for the peak shift can be attributed to dissimilar electronegativity between sulfur and fluorine ions, having electronegativity values of 2.5 and 4 respectively. Electronegativity of an atom in a molecule is the ability of the atom to attract electrons to itself, with fluorine being the element with the largest electronegativity.

IV. GLSOF Fiber Preform and Fiber Fabrication

Fiber containing GLSOF for the core and/or the cladding may be fabricated by several methods, two of which are now described in more detail.

A rod-in-tube (RIT) method may be used for GLSOF fiber preform or fiber fabrication. Glass ingots (typical weight 170 g) are used to cut and polish rods & tubes measuring 10 mm in diameter by 100 mm in length. With a tube of outer diameter 10 mm, and internal diameter of 3.5 mm, a single collapse would give a core-clad ratio of 0.35. Therefore two collapses are required to give core diameters of 15 μm, and three are needed to achieve smaller core diameters (based on a 125 μm outer fiber diameter). The fabrication of such fiber in GLSOF glasses is possible, although repeated heating leads to crystallization in the core and results in fiber with high losses.

Figure 6A:
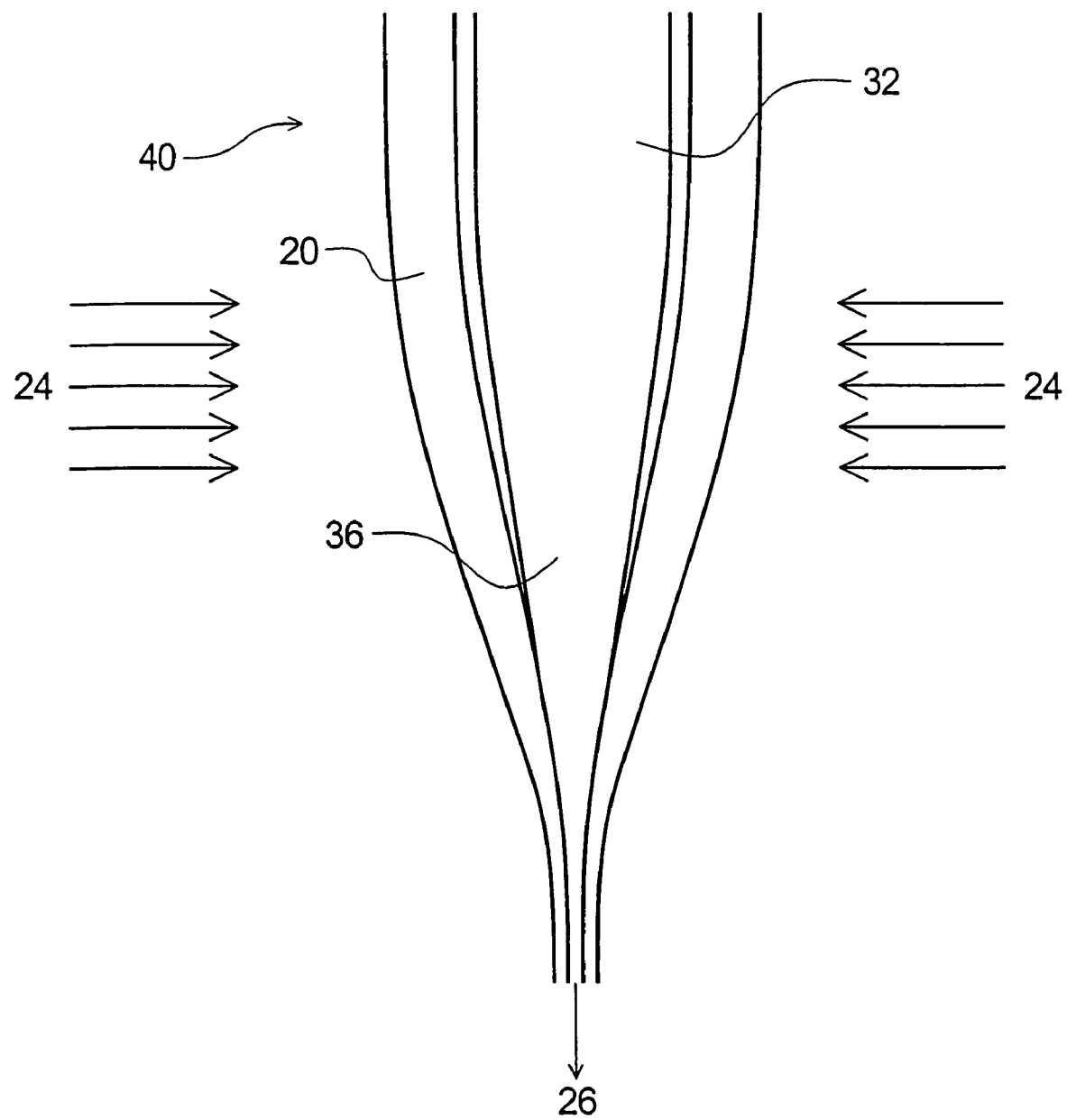
FIG. 6A is a schematic drawing in section of a GLSOF optical fiber being drawn from a rod-in-tube (RIT) preform.

FIG. 6A is a schematic drawing in section of a GLSOF optical fiber being drawn from a rod-in-tube (RIT) preform. The preform 40 comprises a glass tube 20 arranged around a solid rod 32. The solid rod 32, that will form the core in the drawn fiber, is made of GLSOF. The glass tube 20 is made of another glass with compatible thermal properties to GLSOF, for example GLS or related compound.

To implement fiber drawing, heating 24 from a heat source (not shown) is applied to soften the core and cladding glass as the fiber is drawn under a tension 26 in a furnace. The solid core glass rod 32 tapers 36 and coalesces with the cladding glass 20 as the fiber is drawn.

As an alternative to RIT techniques, extrusion has also be used for making GLSOF optical fiber preforms. Extrusion was performed through stainless steel dies, under constant pressure with the temperature adjusted to give a glass viscosity of ~$10^8$ poise (well below $T_g$ which has viscosity of $10^{6.3}$ poise) [3].

FIGS. 6B and 6C show how the core-clad structures are extruded from two discs, arranged such that a core disc 1 initially rests on a cladding disc 2 in an extruder 3. Through this disc geometry it can be seen that the core-clad ratio can be altered to some degree by changing the thickness of the respective discs. By making the core disc thin, the core size in the preform is reduced, but the same general shape is applied for all extrusions using two discs. Fiber drawing is then performed in the same manner as described for the RIT fabrication process described above.

The completed preform is then ready for fiber drawing.

Figure 7A:
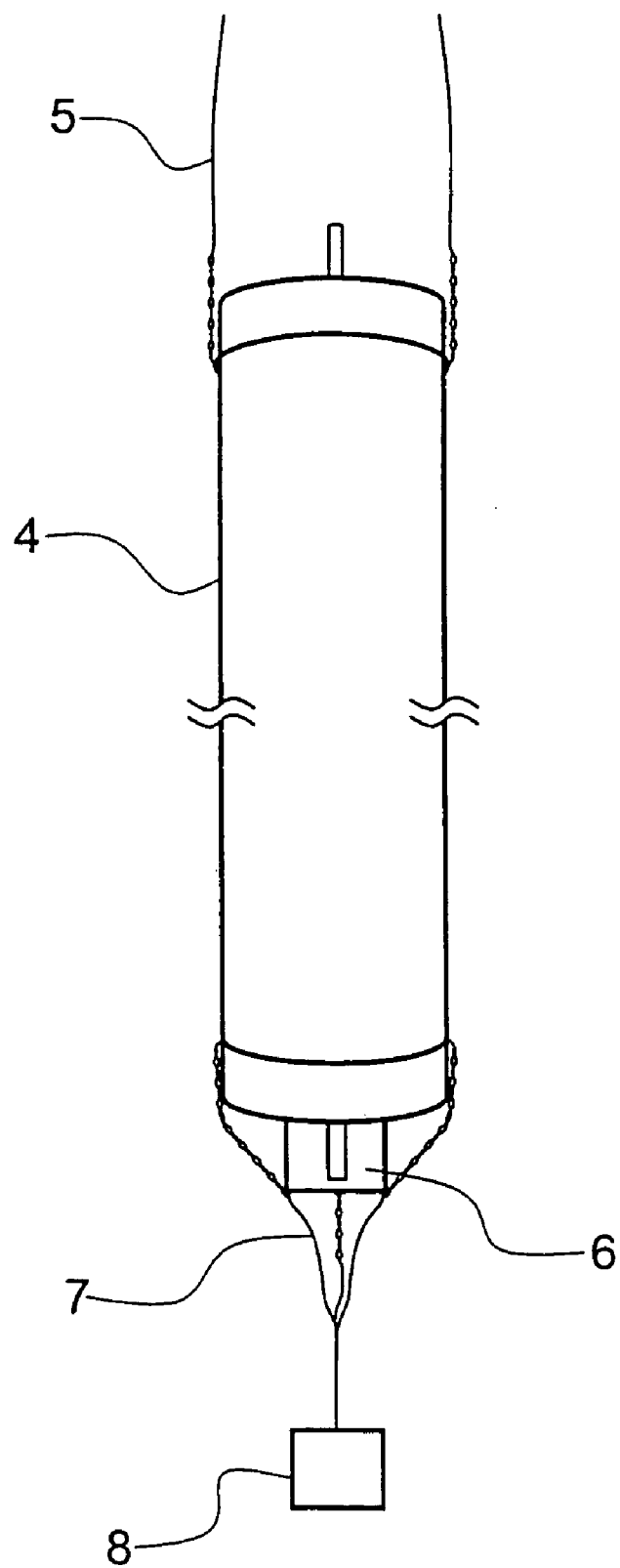
FIG. 7A shows an assembled GLSOF preform and its wiring structure ready for fiber drawing.

FIG. 7A shows the assembled holey fiber preform immediately prior to fiber drawing. Evident in this Figure are the above-mentioned features of the outer jacket 4, the plug 6, the wiring structure made up of upper and lower parts 5 and 7 and the weight 8 used to assist the drawing. In this example, the preform has a length of 100 mm and a diameter of 10 mm. However, there is wide scope to vary the size of the preform. Some of the internal structure is also evident extending from the top end of the outer casing.

For drawing, the preform is placed in a fiber drawing tower. Fiber drawing is performed by the controlled heating and/or cooling of the GLSOF through a viscosity range of around $10^6$ poise. It is useful to monitor the diameter and tension of the fiber as it is being drawn and use the data thus acquired in an automatic feedback loop to control the preform feed speed, the fiber draw speed and/or other parameters related to the furnace in order to yield a uniform fiber diameter.

A principal component of the drawing tower used to pull the preform into fiber form is a heat source, which may be a graphite resistance heater or a radio-frequency (RF) furnace. The use of an RF source is preferred for the precise temperature control it provides. The role of the furnace is to heat the GLSOF preform of FIG. 7A prior to drawing into a fiber.

It is critical to control the fiber drawing temperature, and hence the glass viscosity, so that two criteria are met. First, the fiber drawing temperature must soften the glass to provide a viscosity for which the glass can deform and stretch into a fiber without crystallization. Second, the softening of the glass must not be so great that the crucial internal structure, i.e. the holes, collapse and flow together.

Figure 7B:
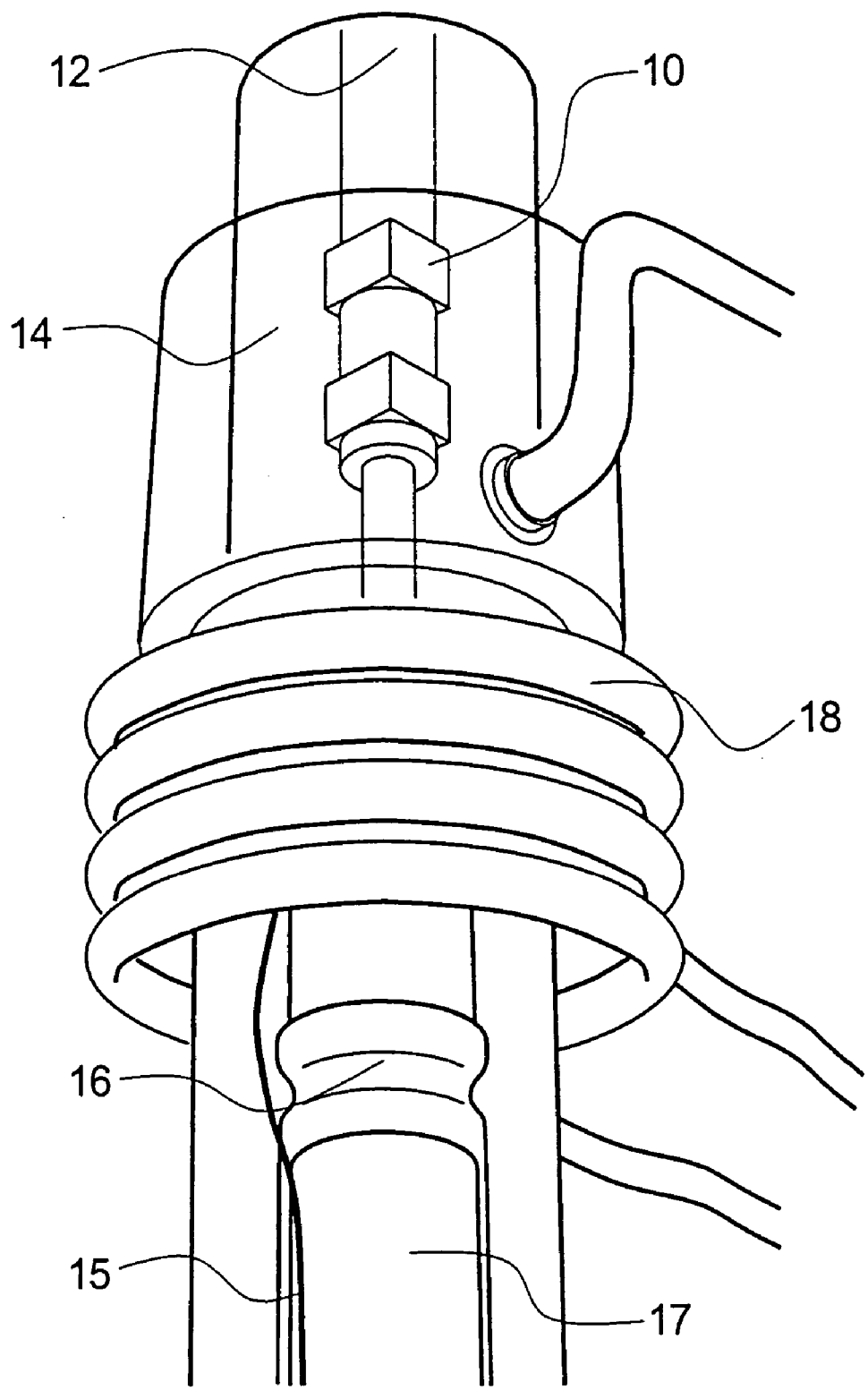
FIG. 7B shows a fiber drawing furnace forming part of a drawing tower for drawing GLSOF fibers.

FIG. 7B shows the custom RF furnace used to draw GLSOF fibers which has been designed to satisfy these two criteria. The furnace incorporates an inductively heated (RF) hot zone defined by water-cooled helically wound RF coils 18. In use, the water cooled RF coils generate an RF field that heats a graphite susceptor (not visible). In the illustrated furnace, the RF coils define a 50 mm long hot zone around and along the preform. In general, it is recommended that, for drawing GLSOF fibers, the furnace provides a hot zone having a length of at least 2 cm. (In comparison, a conventional silica drawing tower typically has a hot zone of about 1 cm in length). The drawing temperature is less than 1800° C. and considerably lower than for silica glass.

A combination of water and gas cooling is provided above and below the hot zone. The cooling keeps the GLSOF outside the hot zone cooled to below its crystallization temperature. Elements of the cooling system are apparent from the Figure, namely an upper gas halo 12, a lower gas halo 16, a cold finger 17, and a water jacket 14 made of silica. The upper gas halo and silica water jacket cool the preform prior to entry into the hot zone. The cold finger, and lower gas halo provide rapid cooling after the fiber emerges from the hot zone. A chuck 10 used to suspend the preform from its upper wiring structure is also indicated. A thermocouple 15 for monitoring furnace temperature is also indicated. The thermocouple forms part of a control system for regulating the furnace temperature.

The fiber is typically pulled under high tension by using weights that are attached to the above-described lower wiring structure. Typically more than 100 g weight is used, more especially a weight of between 100 g and 200 g. This allows the fiber to begin to drop without unnecessary glass wastage and at a lower temperature which minimizes crystallization.

The top ends of the tubes can beneficially be fixed in the preform to prevent them sagging during pulling. This can be done with the wiring at the preform stage or alternatively during drawing by pre-fusing the top of the preform prior to pulling.

A range of different coating materials can be used for coating the outside of the preform prior to or during drawing. Examples of coating materials are standard acrylates, resin, teflon, silicone rubber, epoxy or graphite. In particular, graphite coating can be used to good effect since it promotes stripping of cladding modes and also provides enhanced mechanical strength.

Special procedures used for fabricating holey fibers in GLSOF are now described. The GLSOF is initially formed as described above. Fabrication of the fiber involves two main stages, namely preform fabrication followed by fiber drawing.

Preform fabrication is performed by the steps of tube fabrication, stacking and wiring which are now described in more detail.

The tubes, which ultimately form the holey parts of the fiber, can be made in a variety of ways. Typically, the starting point for the tubes is a large-scale tube of ~1 cm outer diameter (OD). The large-scale tube can be produced by: extrusion, milling and drilling, polishing, piercing, spin/rotational casting, other casting methods (e.g. built-in casting), compression molding, direct bonding etc. The tubes are then caned down using a fiber draw tower to the dimensions required for the preform assembly (~0.5–3 mm OD).

A number of the pre-fabricated caned-down tubes are then stacked together within a larger tube, which acts as a support and a protective outer jacket for the preform. A solid element such as a rod is used to form the core of the fiber.

After stacking, the preform is wired at both its top and bottom ends. The wiring at the top of the preform allows it to be suspended in the furnace, and minimizes the quantity of glass required for the preform. The wiring at the bottom allows a weight to be used in the fiber drawing and helps maintain the tube structure during the draw (see below). It is beneficial to insert a plug at the bottom of the preform to prevent the fine tubes from falling out the bottom of the preform during the fiber drawing. This plug is also fixed in place by the wiring.

Other methods of GLSOF holey fiber preform manufacture and assembly are also possible. For example, one alternative to the above preform fabrication method is to drill and mill the required preform profile out of a single solid piece of the GLSOF. Alternatively, rather than tubes, other geometries of internal structure could be employed.

V. Applications

1. Passive Devices (a) Single Mode Optical Fibers in GLSOF: An optical fiber may advantageously have both a core and clad made of GLSOF. However, GLSOF may be used only for the core (or clad) and a different glass may be used for the clad (or core). The different glass is preferably thermally and chemically compatible to GLSOF, for example GLS or GLSO.

(b) Optical Fiber for Long Wavelengths (e.g. 1–10 microns): Use can be made of the low absorption in the infrared of GLSOF. In particular, GLSOF may be transparent in the 3–5 micron atmospheric transmission window (including CO absorption and emission wavelengths). For example, GLSOF with batch molar composition (70 $Ga_2S_3$: 15 $LaF_3$:15 $La_2O_3$) is transparent in the 3–5 micron range, in fact up to about 7 microns.

FIG. 8 shows use of a GLSOF optical fiber for high power transfer of output from a CO laser 35 which may be used for machining, aerospace or sensor applications. The laser output beam at 5 microns wavelength is coupled into and out of a GLSOF fiber 37 with suitable lenses 36 and 38.

Figure 9:
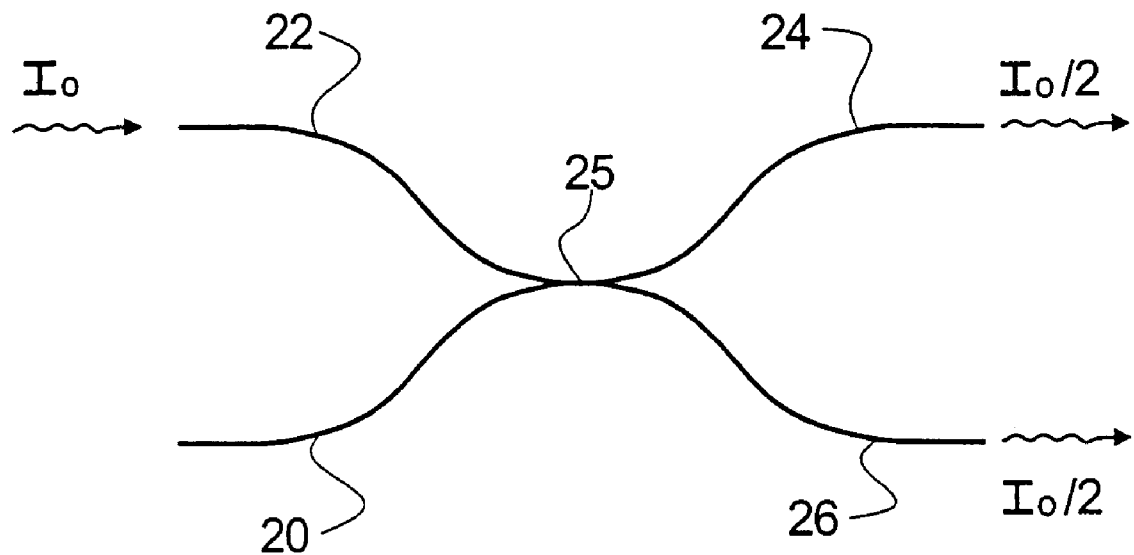
FIG. 9 shows a fused-taper 50:50 coupler made of GLSOF fiber.

(c) Couplers, Splitters etc: In principle, GLSOF fibers could allow the full range of fiber components to be extended to the infrared. An exemplary 50:50 fused coupler is shown in FIG. 9. A fused region 25 interconnects arms 20, 22, 24 and 26, with an input light beam of intensity $I_0$ being split into two beams of half intensity $I_0/2$.

Figure 10:
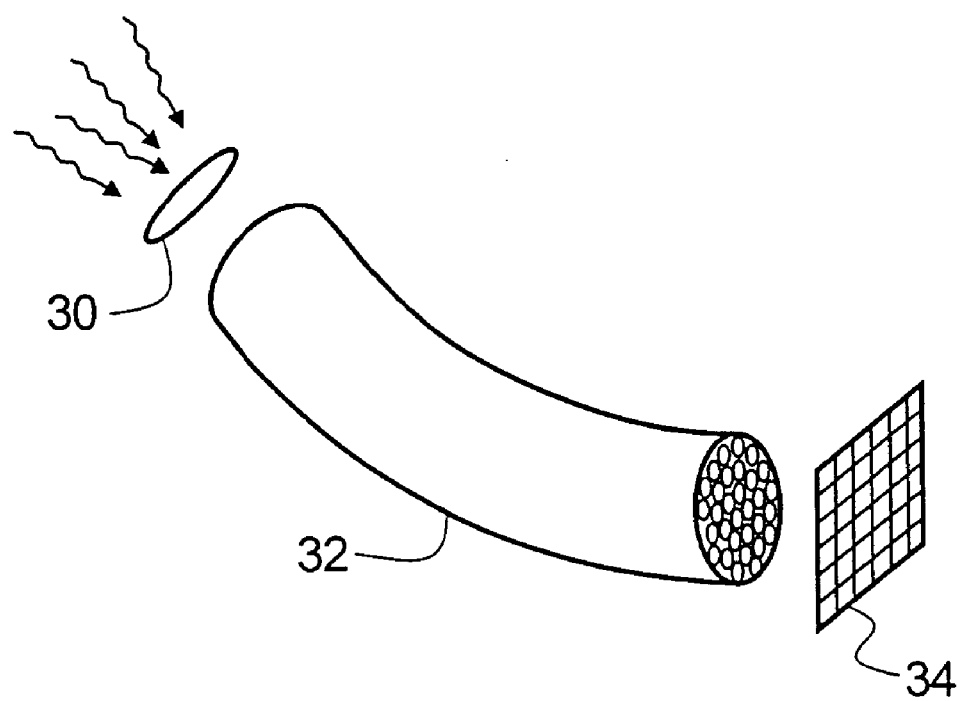
FIG. 10 shows a GLSOF fiber bundle used for array detector imaging.

(d) Infrared Thermal Imaging: GLSOF fibers could be used in a range of thermal imaging applications. FIG. 10 shows a GLSOF fiber bundle 32 used to channel light from an imaging lens 30 to a detector array 34 which will be connected to image processing electronics (not shown).

Figure 11:
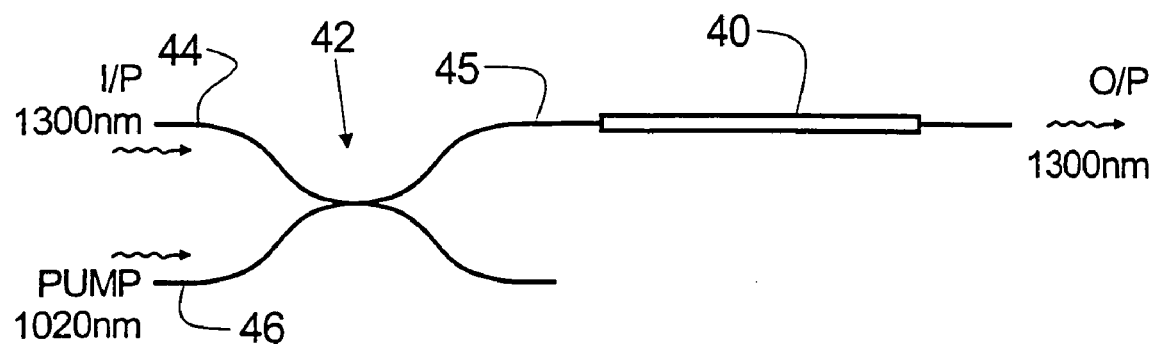
FIG. 11 shows a 1300 nm fiber amplifier based on a Pr:doped GLSOF fiber.

2. Active Devices (a) 1300 nm Optical Amplifier: FIG. 11 shows a 1300 nm band rare-earth doped holey GLSOF fiber amplifier. Pump radiation at 1020 nm from a laser diode and a 1300 mm input signal are supplied to fused coupler input arms 44 and 46, and mixed in a fused region 42 of the coupler. A portion of the mixed pump and signal light is supplied by an output arm 45 of the coupler to a section of $Pr^{3+}$-doped GLSOF fiber where it is amplified and output. Other rare-earth dopants such as Nd or Dy could also be used with an appropriate choice of pump wavelength.

(b) Infrared Fiber Laser: With GLSOF, a new range of laser transitions become efficient and viable, so GLSOF fibers have potential for use as gain media in laser sources. Some examples include using lines at 3.6 and 4.5 microns (Er), 5.1 microns ($Nd^{3+}$), 3.4 microns ($Pr^{3+}$), 4.3 microns ($Dy^{3+}$), etc. More examples for GLSOF are given in reference [4] which is incorporated herein by reference. These transitions could be exploited in a range of lasers, including continuous wave, Q-switched, and mode-locked lasers. In addition, any of the usual rare-earth dopants could be considered depending on the wavelengths desired.

Figure 12:
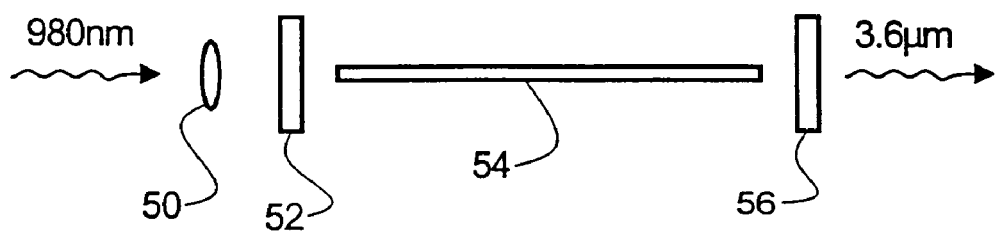
FIG. 12 shows an Er:doped GLSOF fiber laser.

FIG. 12 shows one example of an infrared fiber laser in the form of a laser having an erbium-doped GLSOF fiber gain medium 54 bounded by a cavity defined by a dichroic mirror 52 and output coupler 56. Pump radiation at 980 nm from a laser diode (not shown) is supplied to the cavity through a suitable lens 50. The laser produces a 3.6 micron laser output. It will be appreciated that other forms of cavity mirrors could be used, e.g. in-fiber Bragg grating reflectors.

(c) High-Power Cladding Pumped Laser: The higher index contrast possible in GLSOF fibers allows for fibers with very high numerical aperture (NA) of well in excess of unity. It is therefore possible to provide improved pump confinement and thus tighter focusing, shorter devices, lower thresholds etc.

Figure 13:
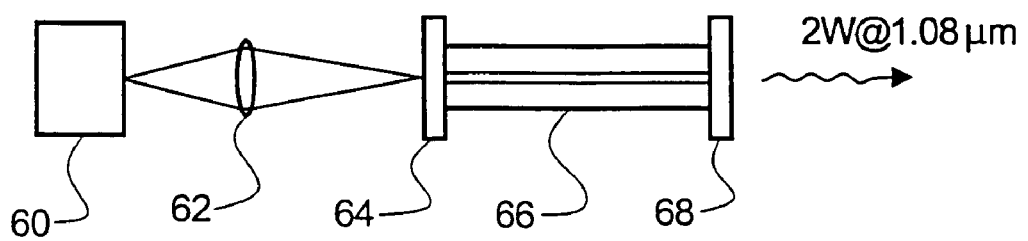
FIG. 13 shows a high power Nd:doped GLSOF fiber laser.

FIG. 13 shows one example in the form of a cladding pumped laser having a GLSOF fiber gain medium 66 doped with Nd. A pump source is provided in the form of a high-power broad-stripe diode 60 of 10 W total output power at 815 nm. The pump source is coupled into the gain medium through a focusing lens 62 and the cavity is formed by a dichroic mirror 64 and output coupler 68 to provide high-power, multiwatt laser output at 1.08 microns.

Figure 14:
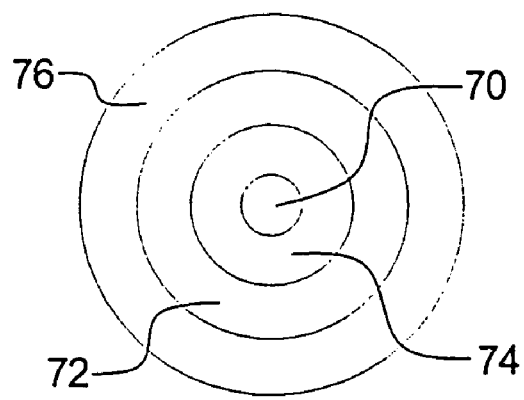
FIG. 14 is a cross-section through the optical fiber of FIG. 13.

FIG. 14 shows in cross-section one possible implementation of the Nd-doped GLSOF fiber of the laser of FIG. 13. A Nd-doped solid core 70 of diameter 'd' and radius 'r1' is surrounded by an inner cladding 74 extending to a radius 'r2' from the center of the fiber. This inner cladding is surrounded by an outer cladding 72 of diameter 'd2' extending out to a radius 'r3' from the fiber center axis. Finally, the entire fiber is encased by a low-index polymer coating 76. The polymer is advantageously doped with a dopant that exhibits absorption at a transmission wavelength of the GLSOF fiber which it is desired to be stripped from the cladding. Graphite can be suitable for this purpose, as can transition metals such as Ti, V, Cr, Mn, Fe, Co, Ni or Cu, and rare earth ions such as Pr, Nd, Sm, Th, Dy, Ho, Er, Tm or Yb. Typically, r1 is a few microns and r2 is about 100–200 microns in order to match the output of the pump diode. The different refractive indices of the core, inner cladding and outer cladding serve to provide a graded index profile.

3. Non-linearity (a) Highly non-linear fiber for switching applications. When the higher third order refractive index constant $n_2$ typical of GLSOF is combined with the high degree of mode confinement achievable with holey fiber, GLSOF fibers could exhibit up to 10000 times the non-linearity of conventional silica fiber. Extremely short fiber based non-linear devices could thus be made for telecom power pulses.

Figure 15:
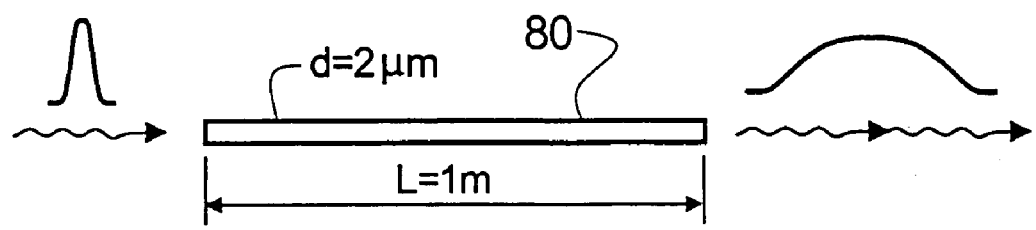
FIG. 15 shows a spectral broadening device based on a GLSOF holey fiber.
Figure 16:
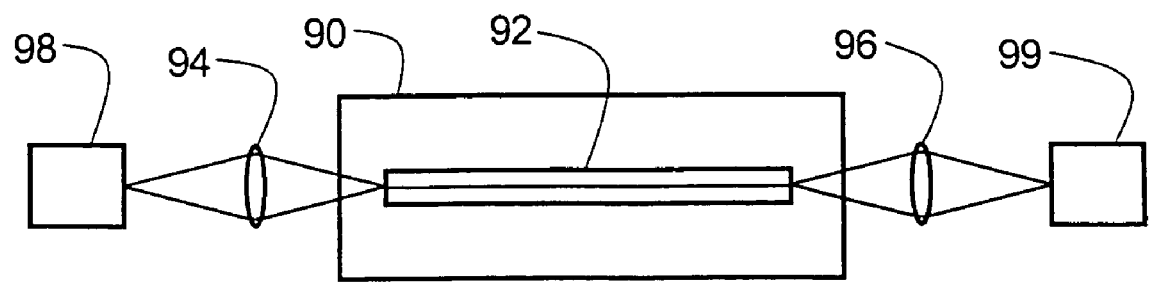
FIG. 16 is an optical fiber gas sensor.

FIG. 15 shows an example non-linear device used for spectral broadening of pulses. For example, consider a GLSOF holey fiber with a small core diameter of 2 microns, length 1 meter and $n_2$ of about 100 times that of silica. The propagation of an initially transform limited Gaussian pulse of approx. 1.7 W peak power in 1 m of fiber should result in a 10-fold spectral broadening, for example from 1 to 10 nm pulse half width. Alternatively, one can express the above example in terms of a maximal phase shift at the pulse center i.e. a 1.7 W Gaussian pulse will generate a peak non-linear phase shift of 8.6 radians after propagation through 1 m of fiber. Note that both of the above calculations neglect the effect of fiber dispersion. Dispersion can play a significant role in the non-linear propagation of a short optical pulse and can for example result in effects such as soliton generation. GLSOF fibers offer for example the possibility of soliton formation at wavelengths not possible with conventional silica fibers.

A range of possibilities exist for using these fibers as the basis for a variety of non-linear optical switches. These include Kerr-gate based switches, Sagnac loop mirrors, non-linear amplifying loop mirrors or any other form of silica fiber based non-linear switches (see reference [5], the contents of which is incorporated herein by reference).

(b) Gas Sensing Applications

Figure 20:
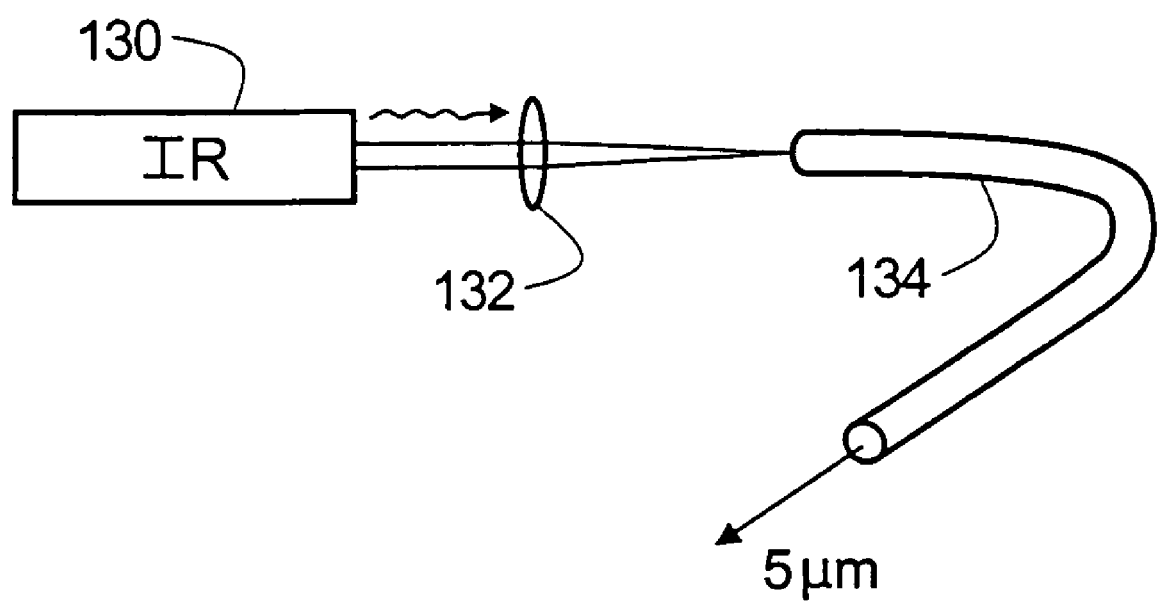
FIG. 20 shows a large core GLSOF fiber used for power delivery of a high power infrared laser.

FIG. 20 shows a sensing device including a GLSOF holey fiber 92. The GLSOF holey fiber is arranged in a gas container 90, containing $CO_2$ gas, for example. A light source 98 is arranged to couple light into the GLSOF fiber via a coupling lens 94 through a window in the gas container. Light is coupled out of the gas container through a further lens 96 and to a detector 99. The detector will register presence of a particular gas through an absorption measurement of the light (for example, absorption of light at 4.2 microns for the detection of $CO_2$).

4. Photosensitivity (a) Fiber gratings for Infrared: Making use of the photosensitivity of GLSOF, gratings can be written using light at longer wavelengths than the conventional UV wavelengths used for writing gratings into silica fiber. The writing beam can be at 633 nm, for example. Techniques developed for writing gratings in silica glass can be adopted, such as stroboscopic phase mask methods [6], inteferometer methods [7] or proximity phase mask methods [8], the contents of these references being incorporated herein by reference. Fiber Bragg grating technology can thus be extended to the infrared/mid infrared. The high index contrast between modes of GLSOF fiber structures also has the advantage of enhancing the separation and control of cladding modes.

Figure 17:
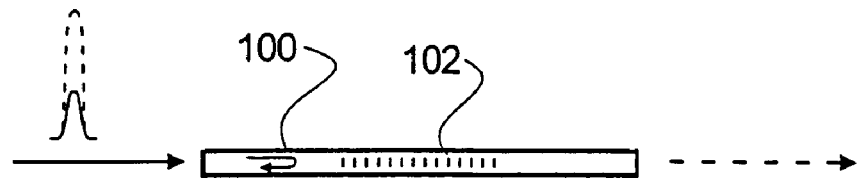
FIG. 17 is an optical switch based on a GLSOF fiber grating.

(b) Non-linear grating based devices: High non-linearity should allow for low threshold grating based devices (logic gates, pulse compressor and generators, switches etc.). For example, FIG. 17 shows an optical switch based on a GLSOF fiber 100 made with a small core diameter of around 1–2 microns and incorporating an optically written grating 102. In operation, pulses at low power (solid lines in the figure) are reflected from the grating, whereas higher power pulses (dashed lines in the figure) are transmitted due to detuning of the grating band gap through Kerr non-linearity.

5. Acoustic Devices

More efficient fiber acousto-optic (AO) devices can be fabricated. The acoustic figure of merit in GLSOF is expected to be as much as 100–1000 times that of silica. This opens the possibility of more efficient fiber AO devices such as AO-frequency shifters, switches etc. Passive stabilization of pulsed lasers may also be provided. Microstructured fibers might also allow resonant enhancements for AO devices via matching of the scale of structural features to a fundamental/harmonic of the relevant acoustic modes. The use of GLSOF would also allow AO devices to be extended to the infrared.

Figure 18:
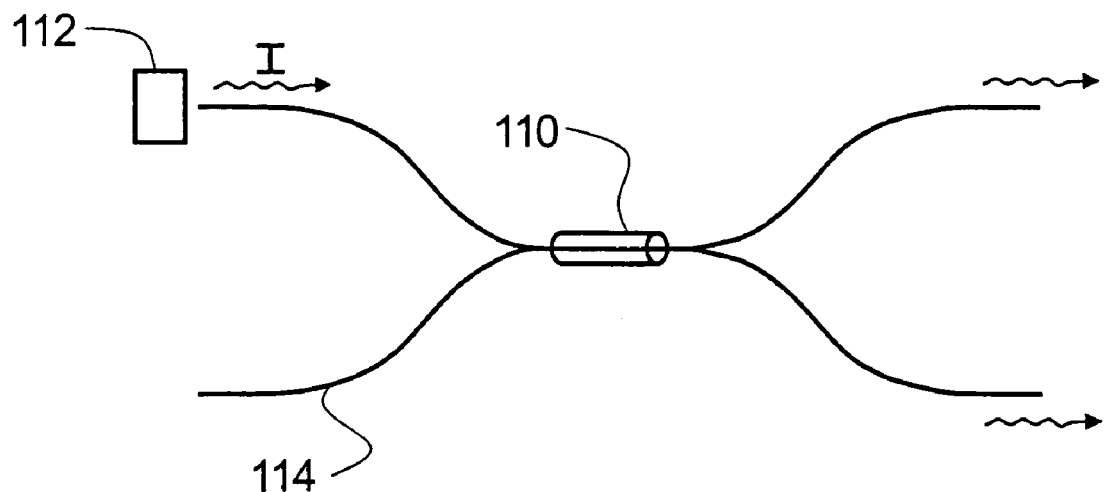
FIG. 18 is a further optical switch based on a null coupler made of GLSOF fiber.

FIG. 18 shows an AO device in the form of a null coupler based on GLSOF fiber. The device has the form of a null coupler 114 with a coupling region at which a piezoelectric transducer 110 is arranged for generating acoustic waves. In the absence of an acoustic wave, light I is coupled from a source 112 into one output arm of the coupler, whereas in the presence of the acoustic wave light is coupled into the other output of the coupler. Further details of devices of this kind can be found in references [9] and [10].

6. Dispersion Effects

GLSOF holey fibers can provide engineerable dispersion in the infrared. In silica holey fibers, a range of highly unusual dispersive properties are possible (such as solitons in the visible, dispersion compensation, dispersion flattening). In GLSOF holey fibers, the dispersion could be tailored to allow a range of new possibilities in the infrared such as: solitons, efficient non-linear processes, parabolic pulse amplifiers etc.

Figure 19:
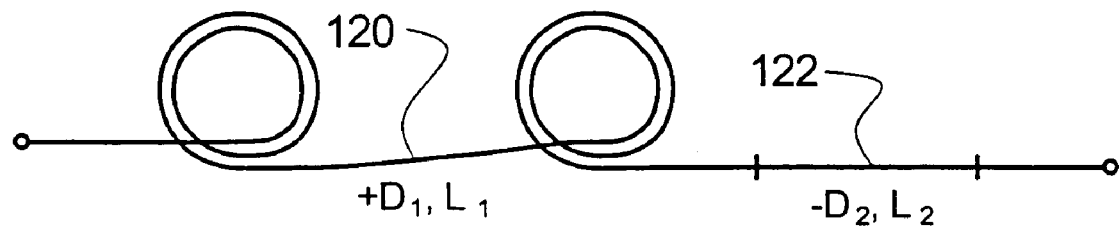
FIG. 19 shows an in-line dispersion compensator formed of a section of GLSOF optical fiber with high negative dispersion.

FIG. 19 shows an example of a dispersion based device. A length $L_2$ of GLSOF holey fiber 122 is arranged in series in a transmission line comprising a length $L_1$ of silica fiber 120, for in-line dispersion compensation. The GLSOF holey fiber has strong negative dispersion $(-D_2)$ to compensate for the weak positive dispersion $(+D_1)$ in the transmission fiber, either as pre- or post-compensation. Such dispersion compensation is appropriate also for use in short pulse fiber lasers operating in the infrared.

7. Mode-Size (a) High Power Handling Fibers for Infrared: Single mode GLSOF fibers with large cores, e.g. ~0.5 mm, could find application in laser cutting, welding and machining. The hole spacing $\Lambda$ is preferably much greater than the wavelength $\lambda$ to be guided and the hole diameter d. In particular, $d/\Lambda$ is preferably less than about 0.2, or than 0.1. The holey structure also provides improved cooling opportunities for high power operation. FIG. 20 shows use of such a fiber 134 for guiding output from a CO high power laser 130, also utilizing a coupling lens 132 for coupling the laser light into the fiber.

REFERENCES

[1] J. Flahaut, M. Guittard, A. M. Loireau-lozach, "Rare-earth Sulfide and Oxysulfide Glasses", *Glass Technology* 24, 149–156, 1986.

[2] S. P. Morgan et al., "Lanthanum-Fluoride addition to gallium-lanthanum-sulfide glasses", *Journal of Non-Crystalline Solids*, 203, 135–142, 1996

[3] K. Itoh, K. Miura, I. Masuda, M. Iwakura, T. Yamashita, "Low-loss Fluorozirco-aluminate Glass-fiber", *J Non-Crystal. Solids*, 167, 112–116, 1994

[4] Y. D. West, T. Schweizer, D. J. Brady and D. W. Hewak, 'Gallium Lanthanum Sulfide Fibers for Infrared Transmission', *Fiber and Integrated Optics*, vol. 19, pages 229–250 (2000).

[5] G. Agrawal, *Nonlinear Fiber Optics*, Academic Press (1995)

[6] WO 98/08120

[7] U.S. Pat. No. 5,822,479

[8] EP-A-0843186

[9] T. A. Birks, S. G. Farwell, P. St. J. Russell & C. N. Pannell "Four-Port Fiber Frequency-Shifter with a Null Taper Coupler" Opt. Lett. Vol. 19(23) pp. 1964–1966 December 1994

[10] S. H. Yun, D. J. Richardson, D. O. Culverhouse and T. A. Birks "All-fiber acousto-optic filter with low polarization sensitivity and no frequency shift" IEEE Phot. Tech. Lett. 1997 Vol. 9(4) pp. 461–453)

[11] Ji Wang et al., "Halide-modified Ga—La sulfide glasses with improved fiber-drawing and optical properties for $Pr^{3+}$-doped fiber amplifiers at 1.3 $\mu$m", *Applied Phys. Lett.*, 71 (13), 29 Sep. 1994

[12] J Wang, D Hewak, W S Brockelsby and D N Payne, "Modifying Binary $Ga_2S_3$—$La_2S_3$ Glass by the addiion of a third Component" 10th International Symposium on Non-oxide Glasses, June 1996

[13] B. V. Strizhkov et. al. *Neorganicheskie Materialy*, 8 (1972), pp 1428–1433

What is claimed is:

1. An optical waveguide, comprising:
a clad of clad glass; and
a core of core glass;
wherein the clad glass comprises:
   gallium;
   lanthanum; and
   sulfur; and
wherein the core glass comprises:
   gallium;
   lanthanum;
   sulfur;
   oxygen; and
   fluorine.

2. An optical waveguide, comprising:
a clad of clad glass; and
a core of core glass;
wherein the clad glass comprises:
   gallium sulfide; and
   lanthanum oxide; and
wherein the core glass comprises:
   gallium sulfide;
   lanthanum oxide; and
   lanthanum fluoride.

3. The optical waveguide of claim 2, wherein the core glass has a higher mol % of gallium sulfide than the clad glass.

4. The optical waveguide of claim 2, wherein the core glass has a lower mol % of lanthanum oxide than the clad glass.

5. The optical waveguide of claim 2, wherein the core glass comprises at least 2 mol % lanthanum fluoride.

6. The optical waveguide of claim 2, wherein the clad glass further comprises lanthanum fluoride.

7. The optical waveguide of claim 6, wherein the core glass has a lower mol % of lanthanum fluoride than the clad glass.

8. The optical waveguide of claim 2, wherein the optical waveguide is an optical fiber.

9. The optical waveguide of claim 2, wherein the optical waveguide is a planar waveguide.

10. The optical waveguide of claim 2, wherein the core comprises a plurality of holes extending along the optical waveguide.

11. The optical waveguide of claim 10, wherein the plurality of holes has a characteristic period in at least one direction.

12. An optical fiber perform, comprising:
a clad of clad glass; and
a core of core glass;
wherein the clad glass comprises:
   gallium sulfide; and
   lanthanum oxide; and
wherein the core glass comprises:
   gallium sulfide;
   lanthanum oxide; and
   lanthanum fluoride.

13. The optical fiber preform of claim 12, wherein the clad glass further comprises lanthanum fluoride.

* * * * *

UNITED STATES PATENT AND TRADEMARK OFFICE
CERTIFICATE OF CORRECTION

| | |
|---|---|
| PATENT NO. | : 7,016,593 B2 |
| APPLICATION NO. | : 10/930865 |
| DATED | : March 21, 2006 |
| INVENTOR(S) | : Daniel William Hewak et al. |

It is certified that error appears in the above-identified patent and that said Letters Patent is hereby corrected as shown below:

Title page,
Item [54], Title, "WAVEGUIDE[[S]]" should read -- WAVEGUIDE --; and "PERFORM" should read -- PREFORM --.
Item [57], ABSTRACT,
Line 8, "perform" should read -- preform --.

Column 22,
Line 48, "perform," should read -- preform, --.

Signed and Sealed this

Eleventh Day of July, 2006

JON W. DUDAS
*Director of the United States Patent and Trademark Office*